United States Patent
Tomiyasu et al.

(10) Patent No.: US 8,605,302 B2
(45) Date of Patent: Dec. 10, 2013

(54) SYSTEM AND METHOD FOR DETERMINING IMAGES AREAS WITHIN SCANNED DOCUMENT

(75) Inventors: Kazuhiro Tomiyasu, Toyokawa (JP); Eiichi Yoshida, Toyokawa (JP); Taketoshi Yamahata, Toyokawa (JP); Shoko Haba, Toyokawa (JP); Masao Hosono, Toyokawa (JP)

(73) Assignee: Konica Minolta Business Technologies, Inc., Chiyoda-Ku, Tokyo (JP)

( * ) Notice: Subject to any disclaimer, the term of this patent is extended or adjusted under 35 U.S.C. 154(b) by 176 days.

(21) Appl. No.: 13/332,513

(22) Filed: Dec. 21, 2011

(65) Prior Publication Data

US 2012/0162682 A1    Jun. 28, 2012

(30) Foreign Application Priority Data

Dec. 24, 2010    (JP) .................................. 2010-288972

(51) Int. Cl.
*G06F 3/12* (2006.01)
*G06K 15/00* (2006.01)
*H04N 1/40* (2006.01)
*B41C 1/00* (2006.01)

(52) U.S. Cl.
USPC ....... 358/1.13; 358/1.15; 358/1.18; 358/3.28; 358/3.31; 358/3.32

(58) Field of Classification Search
None
See application file for complete search history.

(56) References Cited

U.S. PATENT DOCUMENTS

2005/0206917 A1* 9/2005 Ferlitsch ......................... 358/1.5
2009/0273810 A1* 11/2009 Gupta et al. ................. 358/1.18

FOREIGN PATENT DOCUMENTS

JP    2004-289500 A    10/2004
JP    2009-129340 A    6/2009

OTHER PUBLICATIONS

An English Translation of the Office Action (Notification of Reasons for Refusal) dated Jan. 29, 2013, issued in corresponding Japanese Patent Application No. 2010-288972. (2 pages).

* cited by examiner

*Primary Examiner* — Benny Q Tieu
*Assistant Examiner* — Haris Sabah
(74) *Attorney, Agent, or Firm* — Buchanan Ingersoll & Rooney PC

(57)    ABSTRACT

An image forming apparatus obtains area information indicating target areas to be subjected to image processing from a plurality of image processing servers and judges whether or not their target areas are overlapping each other. The image forming apparatus examines the priority levels set in advance for the image processing servers if their target areas are overlapping each other, then repeats to instruct an image processing server with a lower priority level than another image processing server to adjust the position of its target area until it is judged that the target areas are not overlapping each other. And the image forming apparatus transmits information of the target areas confirmed to be not overlapping each other to the image processing servers, so that the image processing servers can successfully perform image processing on their own target areas according to the information.

17 Claims, 17 Drawing Sheets

| Page | Protected Area 1 | Protected Area 2 | Protected Area n |
|---|---|---|---|
| 1 | X=10,Y=20 : X=50,Y=100 | X=30,Y=70 : X=200,Y=300 | ... |
| 2 | X=10,Y=20 : X=50,Y=100 | N/A | |
| 3 | X=30,Y=70 : X=200,Y=30 | N/A | |

| Order of Services | Transfer Port | Service |
|---|---|---|
| 1 | http://www.service1.or.jp/image/ | Merging Character String |
| 2 | http://www.service2.or.jp/image/ | OCR&Adding Advertisement |
| 3 | http://www.service3.or.jp/image/ | Merging QR Code |

SYSTEM AND METHOD FOR DETERMINING IMAGES AREAS WITHIN SCANNED DOCUMENT

This application claims priority under 35 U.S.C. §119 to Japanese Patent Application No. 2010-288972 filed on Dec. 24, 2010, the entire disclosure of which is incorporated herein by reference in its entirety.

BACKGROUND OF THE INVENTION

1. Field of the Invention

The present invention relates to image processing systems each including an image processing apparatus such as a multifunctional digital machine which is referred to as MFP (Multi Function Peripheral) and one single image processing server or a plurality of image processing servers which are connected to each other via a network; image forming apparatuses to be preferably employed in this image processing system; image processing methods for this image processing system; and recording mediums with image processing programs stored thereon to make a computer of the image forming apparatus execute processing.

2. Description of the Related Art

The following description sets forth the inventor's knowledge of related art and problems therein and should not be construed as an admission of knowledge in the prior art.

As is conventionally suggested (for example, Japanese Unexamined Patent Publications No. 2004-289500 and No. 2009-129340), not only an image forming apparatus such as a MFP, just like the one mentioned above, by itself performs all image processing operations on image data inputted thereto, but also such an image forming apparatus makes multiple external image processing servers cooperatively perform their responsible and different image processing operations on image data inputted to the image forming apparatus.

For example, such an image processing system is capable of making: an image processing server with OCR (Optical Character Recognition) function perform an OCR operation on image data obtained by scanning a document with a scanner of an image forming apparatus; an image processing server with translation function translate the recognized characters; and an image processing server with code merging function merge a QR code to the image data obtained by the translation. If making image processing servers with specific functions cooperatively perform specific image processing operations in this way above, an image forming apparatus, whose resources are too limited to perform all image processing operations by itself, does not have to do it; an image forming apparatus only has to employ a simple configuration, which is very advantageous.

And recently, there has been another suggested image processing system which provides image processing services of various service suppliers via the Web so that users can select their preferred ones among them and obtain their target image via the Web, just like SaaS (Software as a Service).

However, the conventional image processing systems to make an external image processing server(s) perform image processing, including the technologies described in the above-introduced Japanese Unexamined Patent Publications No. 2004-289500 and No. 2009-129340, have the following disadvantage.

When multiple image processing servers cooperatively perform image processing operations on image data, the user has to be afraid if the image data could be processed to be an unintended form depending on the order of the image processing operations.

For example, an image pattern 101 such as a security code or QR code is merged to target image data 100 as illustrated in FIG. 25A, which is a conventional method to protect handout documents. However, there is a problem with the conventional method that if a second-order image processing operation is performed on the target image data 100 after the code merging operation, the security code or QR code might hardly be detected because of being unfavorably converted to a different image pattern 102 by the second-order image processing operation, as illustrated in FIG. 25B. There is another problem with the conventional method that if a translation operation is performed on the target image data 100 after the code merging operation, the security code or QR code might go totally against the intended meaning of the user because of being unfavorably converted to a different image pattern 103 by the translation operation, as illustrated in FIG. 25C.

Specifically from the aspect of document protection, security codes or QR codes have been used and needed in more cases for recent years; and accordingly there will be increasing such problems as mentioned above.

The description herein of advantages and disadvantages of various features, embodiments, methods, and apparatus disclosed in other publications is in no way intended to limit the present invention. Indeed, certain features of the invention may be capable of overcoming certain disadvantages, while still retaining some or all of the features, embodiments, methods, and apparatus disclosed therein.

SUMMARY OF THE INVENTION

In a first aspect, the present invention relates to an image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image forming apparatus comprising:
an area information obtainer which obtains area information indicating target areas to be subjected to image processing by the image processing servers, from the image processing servers by outputting thereto the target image data;
a judgment portion which judges whether or not the target areas to be subjected to image processing by the image processing servers are overlapping each other, based on the area information obtained by the area information obtainer;
a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and
a transmitter which transmits information of the target areas which are determined by the judgment portion to be not overlapping each other,
the image processing servers each comprising:
a target area adjuster which adjusts the positions of the target areas according to instructions from the image forming apparatus; and
an image processor which performs an image processing service on the target image data based on the information of the target areas determined to be not overlapping each other, which is received from the image forming apparatus.

In a second aspect, the present invention relates to an image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image forming apparatus comprising:
an area controller which permits areas in the target image data, to be subjected to image processing by the image processing servers and/or prohibits areas in the target image data, from being subjected to image processing by the image processing servers; and
a transmitter which transmits information of the areas permitted by the area controller and/or the areas prohibited by the area controller, to the image processing servers,
the image processing servers each comprising:
an image processor which performs an image processing service on the permitted areas and/or the target image data excluding the prohibited areas, based on the information of the permitted areas and/or the prohibited areas, which is received from the image forming apparatus.

In a third aspect, the present invention relates to an image processing system comprising: an image forming apparatus which outputs target image data; and one image processing sever which performs a series of image processing services in a predetermined order on the target image data originated from the image forming apparatus, while being connected to the image forming apparatus via a network, the image forming apparatus comprising:
an area information obtainer which obtains area information indicating target areas to be subjected to image processing by the image processing server, from the image processing server by outputting thereto the target image data;
a judgment portion which judges whether or not the target areas to be subjected to image processing by the image processing server are overlapping each other, based on the area information obtained by the area information obtainer;
a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and
a transmitter which transmits information of the target areas which are determined by the judgment portion to be not overlapping each other, to the image processing server,
the image processing server comprising:
a target area adjuster which adjusts the positions of the target areas according to instructions from the image forming apparatus;
a transmitter which transmits information of the target areas which are before and after adjusting their positions by the target area adjuster, to the image forming apparatus; and
an image processor which performs an image processing service on the target image data based on the information of the target areas determined to be not overlapping each other, which is received from the image forming apparatus.

In a fourth aspect, the present invention relates to an image processing system comprising: an image forming apparatus which outputs target image data; and one image processing sever which performs a series of image processing services in a predetermined order on the target image data originated from the image forming apparatus, while being connected to the image forming apparatus via a network, the image forming apparatus comprising:
an area controller which permits areas in the target image data, to be subjected to image processing by the image processing server and/or prohibits areas in the target image data, from being subjected to image processing by the image processing server; and
a transmitter which transmits information of the areas permitted by the area controller and/or the areas prohibited by the area controller, to the image processing server,
the image processing server comprising:
an image processor which performs an image processing service on the permitted areas and/or the target image data excluding the prohibited areas, based on the information of the permitted areas and/or the prohibited areas, which is received from the image forming apparatus.

In a fifth aspect, the present invention relates to an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, the image forming apparatus comprising:
an area information obtainer which obtains area information indicating target areas to be subjected to image processing by the image processing servers, from the image processing servers by outputting thereto the target image data;
a judgment portion which judges whether or not the target areas to be subjected to image processing by the image processing servers are overlapping each other, based on the area information obtained by the area information obtainer;
a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and
a transmitter which transmits information of the target areas which are determined by the judgment portion to be not overlapping each other.

In a sixth aspect, the present invention relates to an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, the image forming apparatus comprising:
an area controller which permits areas in the target image data, to be subjected to image processing by the image processing servers and/or prohibits areas in the target image data, from being subjected to image processing by the image processing servers; and
a transmitter which transmits information of the areas permitted by the area controller and/or the areas prohibited by the area controller, to the image processing servers.

In a seventh aspect, the present invention relates to an image processing method for an image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image processing method comprising:
the following steps of the image forming apparatus:
obtaining area information indicating target areas to be subjected to image processing by the image processing servers, from the image processing servers by outputting thereto the target image data;
judging whether or not the target areas to be subjected to image processing by the image processing servers are overlapping each other, based on the area information obtained;
examining the priority levels set in advance for the image processing servers if it is judged that the target areas are overlapping each other, then repeating to instruct an image processing server with a lower priority level than another image processing servers to adjust the position of its target area until it is judged that the target areas are not overlapping each other; and
transmitting information of the target areas which are determined to be not overlapping each other; and
the following steps of each of the image processing servers:
adjusting the positions of the target areas according to instructions from the image forming apparatus; and
performing an image processing service on the target image data based on the information of the target areas determined to be not overlapping each other, which is received from the image forming apparatus.

In an eighth aspect, the present invention relates to an image processing method for an image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image processing method comprising:
the following steps of the image forming apparatus:
permitting areas in the target image data, to be subjected to image processing by the image processing servers and/or prohibiting areas in the target image data, from being subjected to image processing by the image processing servers; and transmitting information of the permitted areas and/or the prohibited areas to the image processing servers; and
the following step of each of the image processing servers:
performing an image processing service on the permitted areas and/or the target image data excluding the prohibited areas, based on the information of the permitted areas and/or the prohibited areas, which is received from the image forming apparatus.

In a ninth aspect, the present invention relates to a non-transitory computer-readable recording medium with an image processing program being stored thereon to make a computer of an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, execute:
obtaining area information indicating target areas to be subjected to image processing by the image processing servers, from the image processing servers by outputting thereto the target image data;
judging whether or not the target areas to be subjected to image processing by the image processing servers are overlapping each other, based on the area information obtained;
examining the priority levels set in advance for the image processing servers if it is judged that the target areas are overlapping each other, then repeating to instruct an image processing server with a lower priority level than another image processing server to adjust the position of its target area until it is judged that the target areas are not overlapping each other; and
transmitting information of the target areas which are determined to be not overlapping each other.

In a tenth aspect, the present invention relates to a non-transitory computer-readable recording medium with an image processing program being stored thereon to make a computer of an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, execute:
permitting areas in the target image data, to be subjected to image processing by the image processing servers and/or prohibiting areas in the target image data, from being subjected to image processing by the image processing servers; and
transmitting information of the permitted areas and/or the prohibited areas to the image processing servers.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by way of example, and not limitation, in the accompanying figures, in which.

DETAILED DESCRIPTION OF THE PREFERRED EMBODIMENTS

In the following paragraphs, some preferred embodiments of the invention will be described by way of example and not limitation. It should be understood based on this disclosure that various other modifications can be made by those in the art based on these illustrated embodiments.

Hereinafter, one mode of implementing the present invention will be described with reference to the accompanying drawings.

Figure 1:
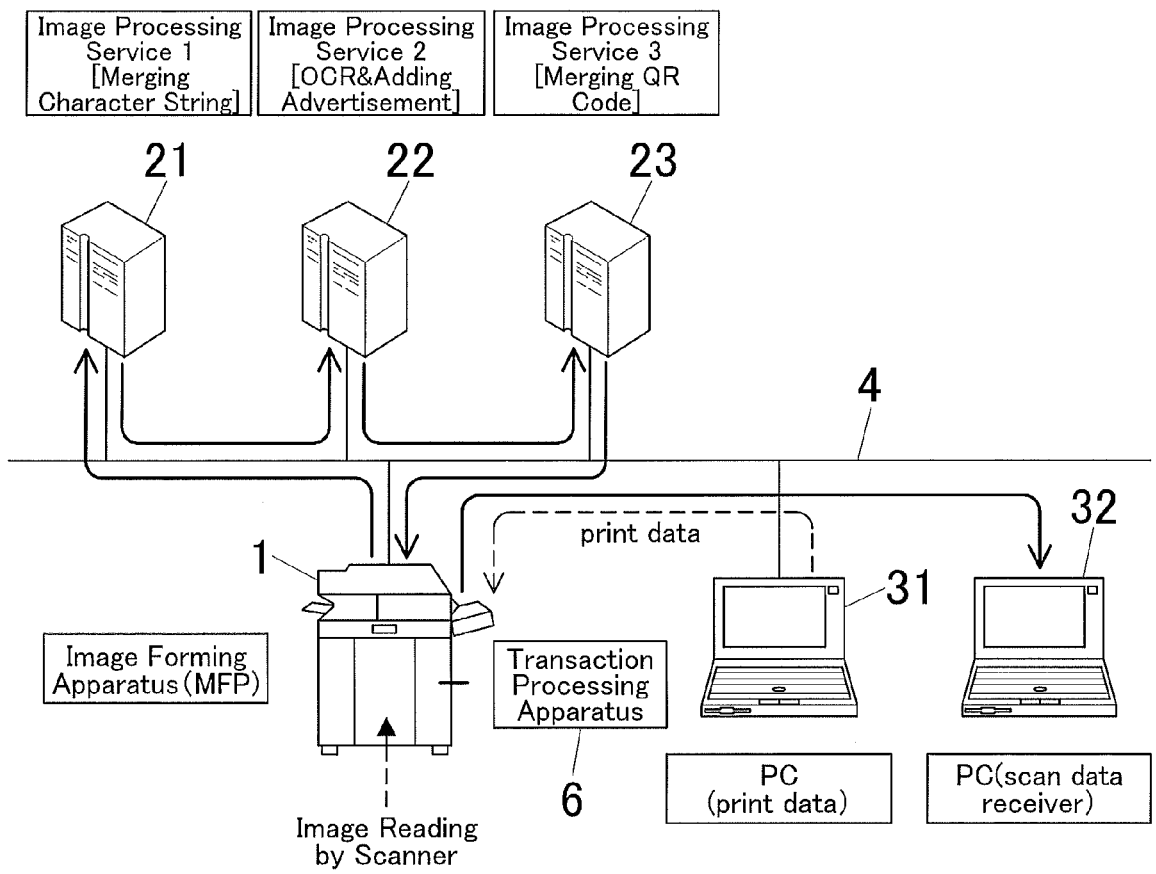
FIG. 1 is a view illustrating a configuration of an image processing system according to one mode of implementing the present invention.

FIG. 1 is a view illustrating a configuration of an image processing system according to one mode of implementing the present invention.

As illustrated in FIG. 1, the image processing system is provided with: an image forming apparatus 1; multiple image processing servers 21-23 (three, in this mode of implementation); and multiple terminals 31-32 which are PCs owned by users, all of which are connected to each other via a network 4.

According to this mode of implementation, the multiple image processing servers 21-23 are configured to cooperatively perform their responsible image processing services on image data read out from a document by the image forming apparatus 1 or print data received from the terminals 31-32, in a predetermined order.

More specifically, the image processing server 21 is in charge of an image processing service 1, for example performing a code merging operation to merge a security code for document protection, to target image data.

The image processing server 22 is in charge of an image processing service 2, for example performing an optical character recognition (OCR) operation and ad-giving operation on the image data obtained by the code merging operation of the image processing server 21. In other words, an advertising banner is given to a certain position of the image data after extracting a text from the image data.

The image processing server 23 is in charge of an image processing service 3, for example performing an operation to merge a 2-dimensional code such as a QR code to the image data obtained by the optical character recognition operation and ad-giving operation of the image processing server 21. After that, the image processing server 32 returns the image data to the image forming apparatus 1. Instead of a 2-dimensional code, a barcode representing a code, for example, may be merged to the image data.

The image forming apparatus 1, as which a MFP, a multi-functional digital machine is employed according to this mode of implementation, gives an instruction to cooperatively perform image processing to the image processing servers 21-23; the image forming apparatus 1 has a copier function, a scanner function, a facsimile (FAX) function, a printer function, a memory function, and the like.

Figure 2:
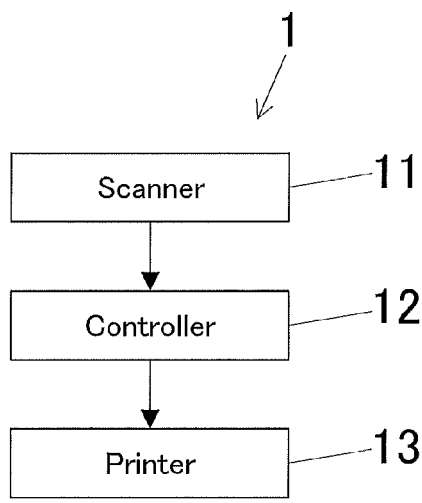
FIG. 2 is a block diagram illustrating a configuration of an image forming apparatus employed in the image processing system of FIG. 1.

FIG. 2 is a block diagram illustrating a configuration of the image forming apparatus 1.

The image forming apparatus 1 is provided with: a scanner 11 for reading an image of a document and converting it to image data, i.e. electronic data; a controller 12 for performing operations on the image data obtained by the scanner 11 and transmitting it to a printer 13; and a printer 13 for printing out on paper image data received from the controller 12.

Figure 3:
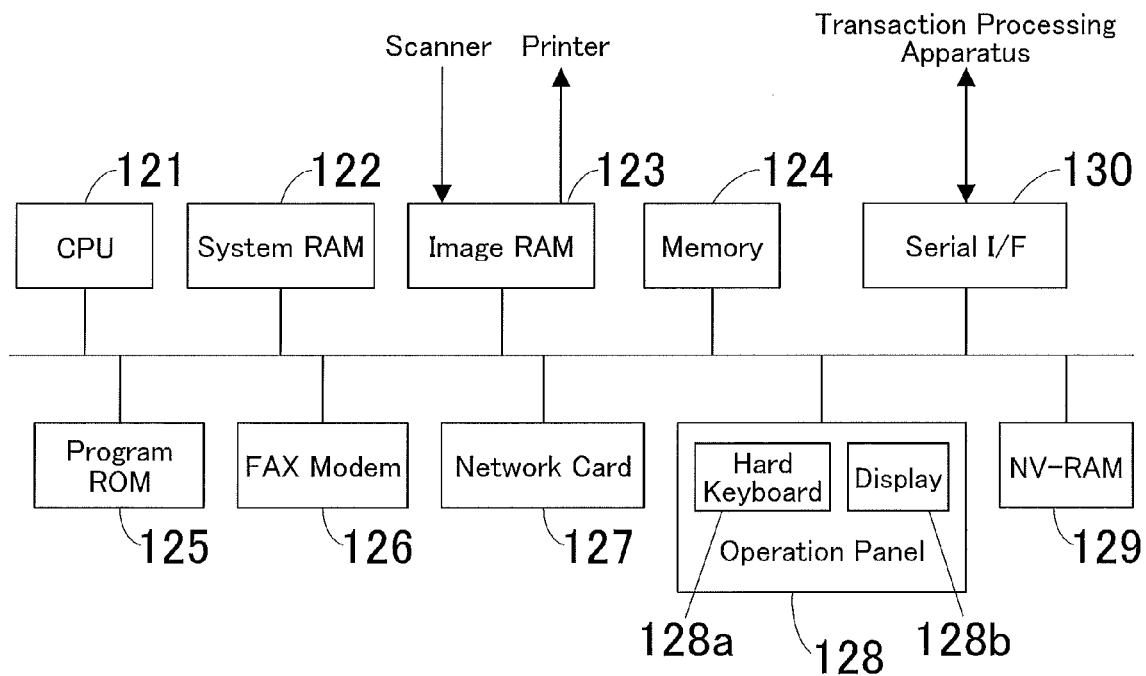
FIG. 3 is a block diagram illustrating a controller of the image forming apparatus in detail.

FIG. 3 is a block diagram illustrating the details of the controller 12.

The controller 12 is provided with: a CPU 121, a system RAM 122, an image RAM 123, a memory 124, a program ROM 125, a FAX modem 126, a network card 127, an operation panel 128, a NV-RAM 129, a serial interface (serial I/F) 130, and the like.

The CPU 121 integrally controls the entire image forming apparatus 1 by executing the various functions of the image forming apparatus 1 including a copier function, a printer function, a FAX function, and the like. Specifically, in this mode of implementation, the CPU 121 further performs the following control operations. The CPU 121 transmits target image data to the image processing servers 21-23 to request for area information indicating target areas to be subjected to image processing by the image processing servers 21-23, and judges whether or not the target areas are overlapping each other based on the area information received therefrom. If the target areas are overlapping each other, the CPU 121 instructs an image processing server with a lower priority level than another image processing server to adjust the position of its target area, and repeats to give such an instruction until the target areas are not overlapping each other. And the CPU 121 transmits information of the target areas determined to be not overlapping each other, to the image processing servers 21-23. Furthermore, the CPU 121 generate service information (to be described in detail) indicating the order of performing a plurality of image processing services specified by the user, and transmits the service information and the target image data to the image processing server 21 in charge of a first-order image processing service.

The system RAM 122 cumulatively stores necessary data for the CPU 121 to execute operation programs and temporarily keeps a memory area while the operation programs are active.

The image RAM 123 is a memory which temporarily stores image data received from the scanner 11 or the like.

A hard disk drive (HDD), for example, constitutes the memory 124; the memory 124 stores image data received from the scanner 11 or the like, application programs, and other data. Specifically, in this mode of implementation, the memory 124 further stores the details of the available image processing services obtained from the image processing servers 21-23, registered thereon.

The program ROM 125 is a memory which stores operation programs for the CPU 121. The program ROM 125 further stores programs to control the display and the key input on the operation panel 128, graphic data to display keys on a display 128b of the operation panel 128, 'key management information' defining how to react with key presses.

The FAX modem 126 is a device which transmits and receives FAX; the network card 127 serves as a communicator which performs communication with the image processing servers 21-23 and external machines such as the terminals 31-32, via the network 4.

The operation panel 128, which is provided with a hard keyboard 128a including a Start key, a Stop key, a numeric keypad, and the like, allows users to operate the image forming apparatus 1; a display 128b, which is a liquid crystal display with touch-panel functionality, displays messages, operation status, and soft keys for users.

The NV-RAM 129 is a memory which stores nonvolatile information and the like specified by users.

The serial I/F 130 is an interface which transmits and receives charging information to and from a transaction processing apparatus 6. The transaction processing apparatus 6 performs an operation to charge a fee for the used image processing services; instead of the transaction processing apparatus 6, the image processing servers 21-23 may perform such an operation.

When a copier function is executed on the image forming apparatus 1, image data obtained by the scanner 11 is temporarily stored on the image RAM 123. And then the image data is transmitted to the printer 13 to be printed out.

When a scanner function is executed on the image forming apparatus 1, image data obtained by the scanner 11 is temporarily stored on the image RAM 123. And the image data is read out by the CPU 121 to be encoded to an all-purpose image form. And then the image data can be externally transmitted over e-mail or FTP from the network card 127.

When a FAX transmitting function is executed on the image forming apparatus 1, image data obtained by the scanner 11 is temporarily stored on the image RAM 123. And the image data is converted to a suitable resolution and a compressed form by the CPU 121 so as to be transmitted by FAX, then externally transmitted via the FAX modem 126.

When a FAX receiving function is executed on the image forming apparatus 1, image data received via the FAX modem 126 is temporarily stored on the image RAM 123. And the image data is converted to a suitable form by the CPU 121, then transmitted to the printer 13 to be printed out.

When a printer function is executed on the image forming apparatus 1, a page description language is developed in the image RAM 123 by the CPU 121, then transmitted to the printer 13 to be printed out.

The page description language may be stored on the memory 124 so as to be later printed out as many times as needed. When the user gives an instruction to store image data, image data stored on the image RAM 123 is transferred to the memory 124 to be stored thereon.

The operations of the image forming apparatus 1 as described above, for example reading out image data and printing out print data, will not be further described in detail because they are well-known technologies for the image forming apparatus 1.

Furthermore, in this mode of implementation, the image forming apparatus 1 and a group of the image processing servers 21-23 are configured to mutually exchange: the target image data originated from the image forming apparatus 1; area information generated by the image processing servers 21-23; and the like, via the network 4. The data communication is performed over HTTP protocol.

Figure 4:
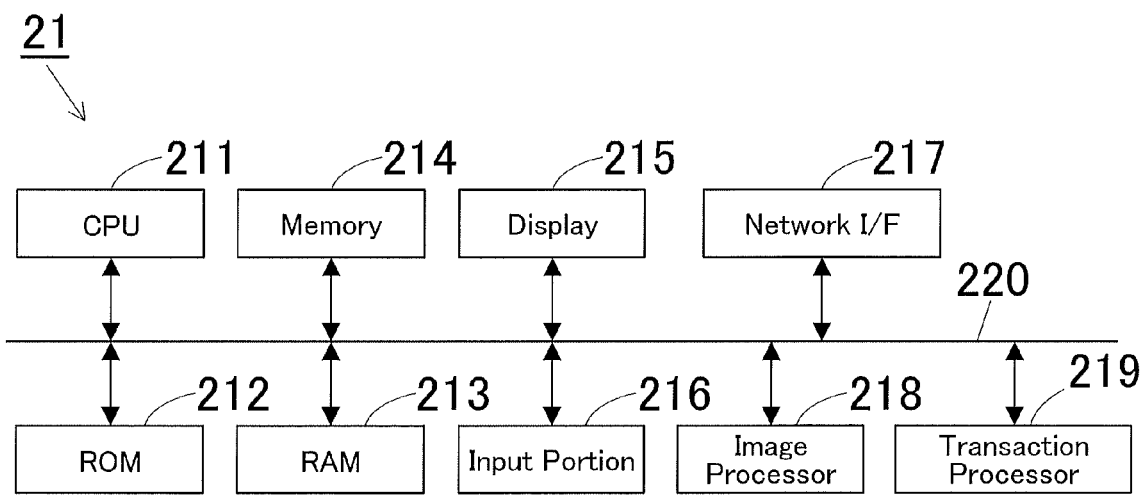
FIG. 4 is a block diagram illustrating a configuration of an image processing server.

FIG. 4 is a block diagram illustrating a configuration of the image processing servers 21-23. Hereinafter, a configuration of the image processing server 21 will be substantially described on behalf of the image processing servers 21-23, all of which have an identical configuration.

An all-purpose computer constitutes the image processing server 21; as illustrated in FIG. 4, the image processing server 21 is provided with: a CPU 211; a ROM 212; a RAM 213; a memory 214; a display 215; an input portion 216; a network interface (network I/F) 217; an image processor 218; a transaction processor 219; and the like, all of which are connected to each other via a system bus 220.

The CPU 211 integrally controls the entire image processing server 21 by executing operation programs stored on a recording medium such as the ROM 212. Specifically, in this mode of implementation, receiving from the image forming apparatus 1 a request for information of the target areas to be subjected to image processing by the image processing server 21, the CPU 211 returns such information to the image forming apparatus 1.

And the CPU 211 instructs the image processor 218 to perform an image processing service on the target areas in the target image data, which are determined by the image forming apparatus 1, and transmits the target image data obtained by the image processor 218, and the like to the image processing server 22. And then the CPU 211 instructs the transaction processor 219 to process a charge for the finished image processing service.

The ROM 212 is a recording medium which stores programs and other data for the CPU 211 to execute processing.

The ROM 213 is a recording medium which provides a work area for the CPU 11 to execute processing according to an operation program.

A hard disk drive, for example, constitutes the memory 214; the memory 214 stores application programs and other various types of data.

A CRT display or a liquid-crystal display constitutes the display 215; the display 215 displays various messages, entry accepting screens, selection screens, and other screens for users.

The entry portion 216, which serves users to perform input operations, is provided with a keyboard, a mouse, and the like.

The network interface 217 serves as a communicator which transmits and receives data with the image forming apparatus 1, the image processing servers 22-23, the terminals 31-32, and other external machines, via the network 4.

The image processor 218 performs a predetermined image processing operation on target image data under control of the CPU 211.

The transaction processor 219 processes a transaction to charge for the code merging operation finished by the image processor 218.

The following is the overview of the operations of the image processing system of FIG. 1.

Figure 5:
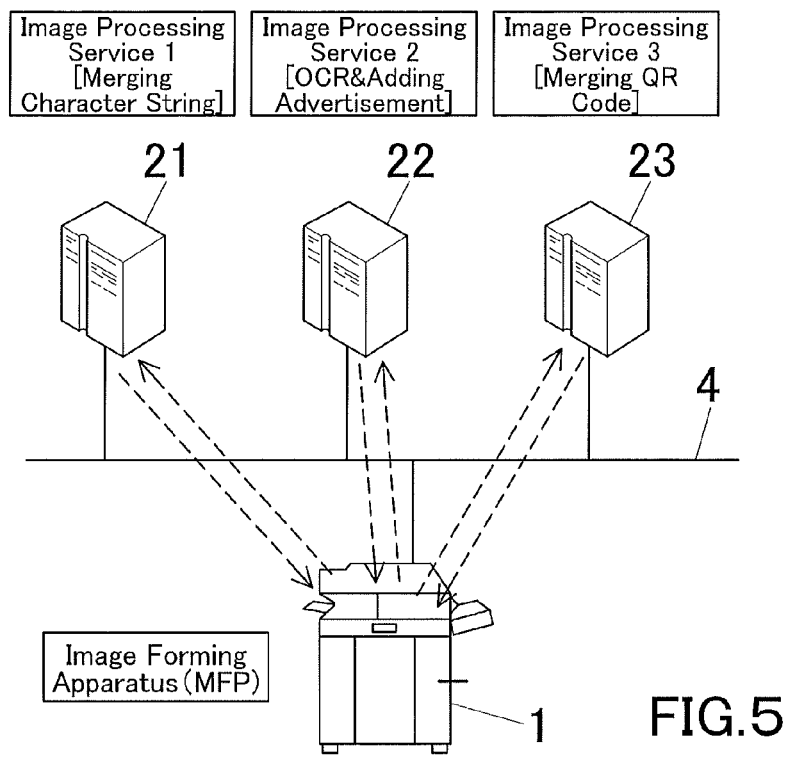
FIG. 5 is a view to explain the overview of the operations performed by the image processing system of FIG. 1.

Initially, as illustrated in FIG. 5, the image forming apparatus 1 obtains the details of the available image processing services by accessing the image processing servers 21-23 over HTTP protocol, and registers the available image processing services on the image forming apparatus 1 itself.

Figure 6:
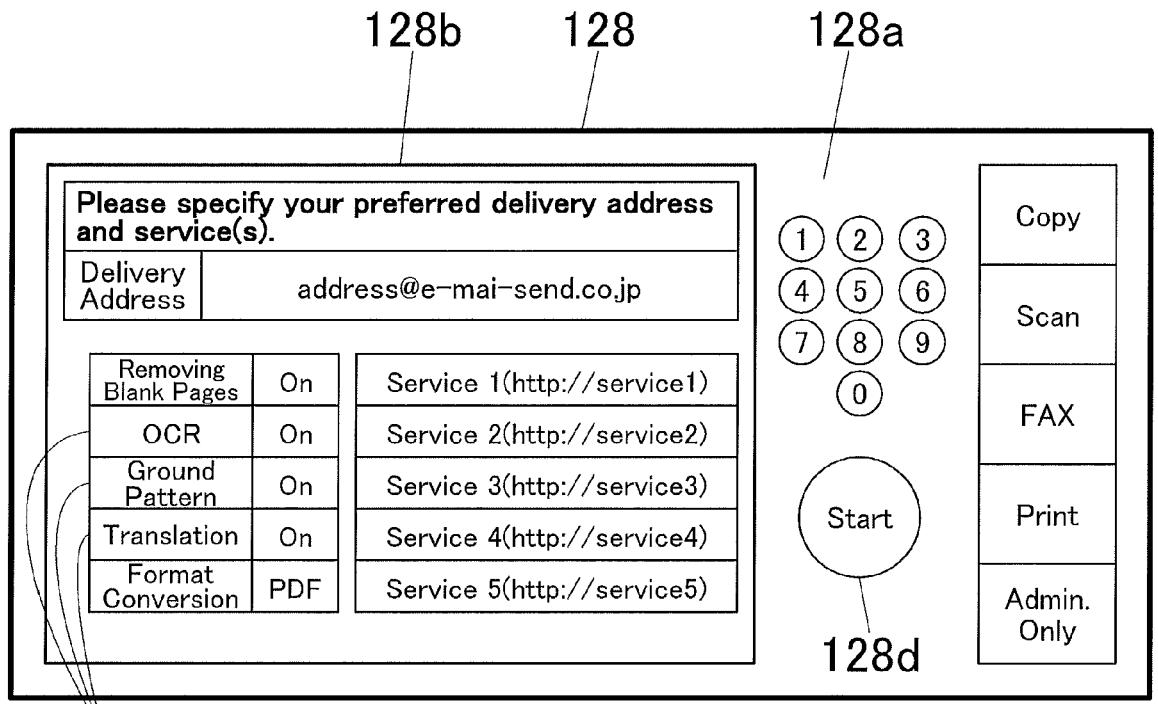
FIG. 6 is a plain view illustrating an operation panel which displays keys for selecting an image processing service.

When the available image processing services are successfully registered on the image forming apparatus 1, keys 128c for selecting image processing services appear on the display 128b of the operation panel 128, as illustrated in FIG. 6. The user selects desirable image processing services and starts the operations by pressing the Start key 128d.

When accessing the image processing servers 21-23 to obtain the details of the available image processing services, the image forming apparatus 1 also obtains 'function', 'location', and the like of the available image processing services and stores them on itself.

When the Start key 128d is pressed, the image forming apparatus 1 transmits target image data (hereinafter also will be referred to as 'document image') inputted thereto, to the image processing servers 21-23 as indicated by solid arrows in FIG. 7.

Figure 7:
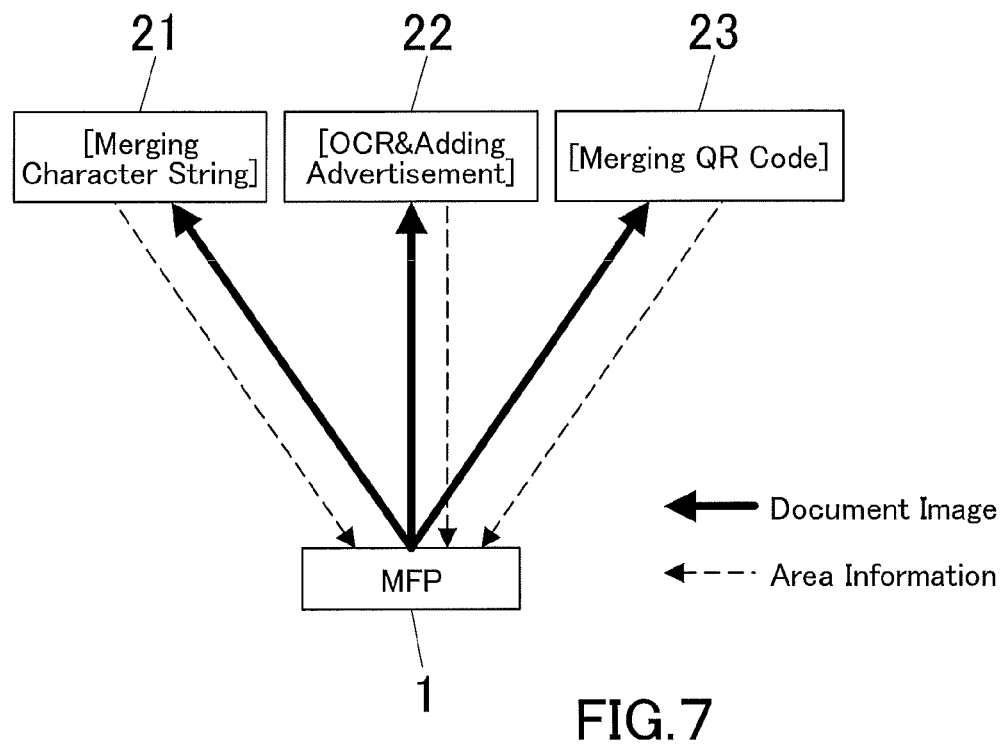
FIG. 7 is a view to explain a procedure to obtain area information from the image processing servers.

Receiving the document image from the image forming apparatus 1, the image processing servers 21-23 individually determine target areas in the document image, which is to be subjected to image processing by themselves, and return area information indicating the determined target areas to the image forming apparatus 1 as indicated by dashed arrows in FIG. 7.

Alternatively, the image processing servers 21-23 return not only the area information, but also information indicating the priorities (also referred to as 'priority levels') defined for the image processing servers in advance, to the image forming apparatus 1.

For example, from the image processing server 21, the image forming apparatus 1 receives area information indicating target areas R1 and R11 at header and footer positions, respectively, both with the priority level B. Similarly, from the image processing server 22, the image forming apparatus 1 receives area information indicating a target area R2 for an advertising banner, with the priority level C. Also similarly, from the image processing server 23, the image forming apparatus 1 receives area information indicating a target area R3 which includes an assigned area for a QR code and the area around the assigned area, with the priority level A. In this mode of implementation, there are the priority levels A, B, and C in descending order.

Figure 8:
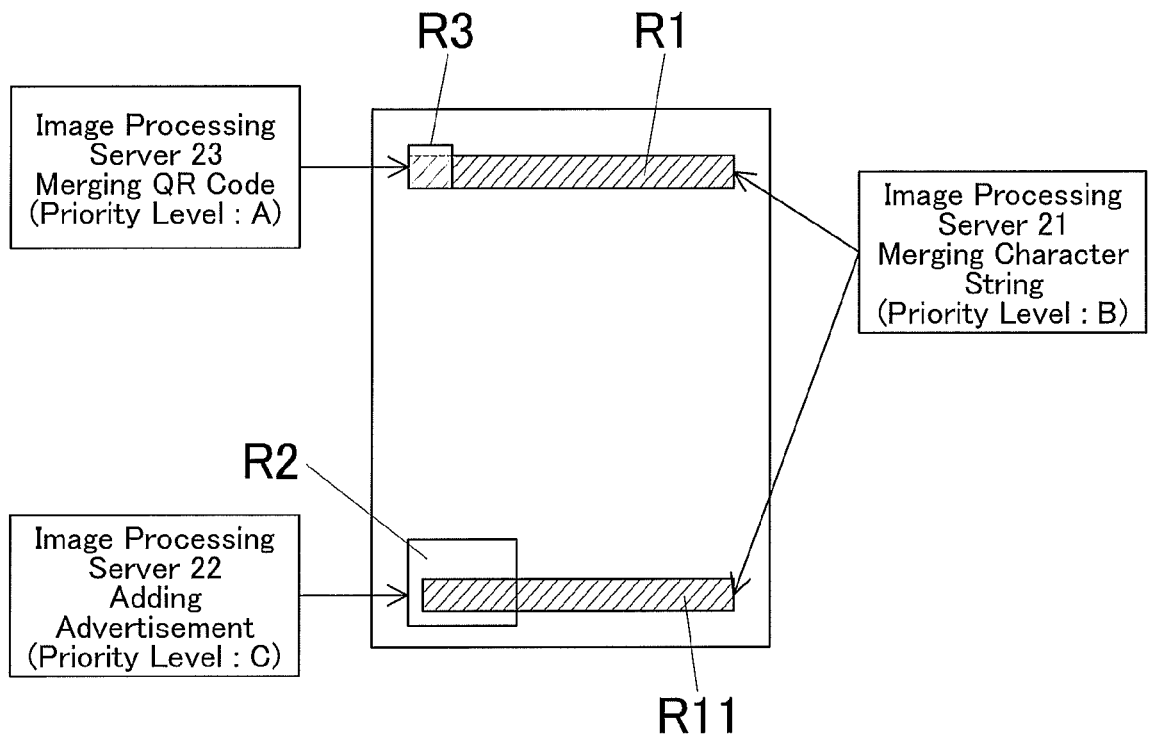
FIG. 8 illustrates a situation where the target areas of the image processing servers are overlapping each other.

Collecting area information from the image processing servers 21-23, the image forming apparatus 1 stores it on itself as area control data. And based on the area information, the image forming apparatus 1 judges whether or not the target areas of the image processing servers 21-23 are overlapping each other. In this mode of implementation, as illustrated in FIG. 8, the target area R1 of the image processing server 21 and the target area R3 of the image processing server 23 are partially overlapping each other, while the target area R11 of the image processing server 21 and the target area R2 of the image processing server 22 are partially overlapping each other.

Therefore, by comparing the priority level of the image processing server 21 (the target area R1) with that of the image processing server 23 (the target area R3), the image forming apparatus 1 judges that the image processing server 23 is prioritized over the image processing server 21. And as indicated by a double-lined arrow (1) of FIG. 9, the image forming apparatus 1 transmits an instruction to change the position of the target area R1, to the image processing server 21, along with area control data indicating the target area R3 of the image processing server 23.

Receiving such an instruction, the image processing server 21 limits its target area only to the target area R11 while cancelling the target area R1 at header position, and as indicated by a dashed arrow (2) of FIG. 9, again transmits area information indicating the adjusted target area, the target area R11 at footer position only, to the image forming apparatus 1.

And based on the area information, the image forming apparatus 1 judges whether or not the target areas of the image processing servers 21-23 are overlapping each other. That is, since the target area R11 of the image processing server 21 and the target area R2 of the image processing server 22 are partially overlapping each other, the image forming apparatus 1 judges that the image processing service of the image processing server 21 is prioritized over that of the image processing server 22. And the image forming apparatus 1 transmits an instruction to change and adjust the position of the target area R2, to the image processing server 22, along with area control data indicating the target area R11 of the image processing server 21 (see a double-lined arrow (3) of FIG. 9).

Figure 9:
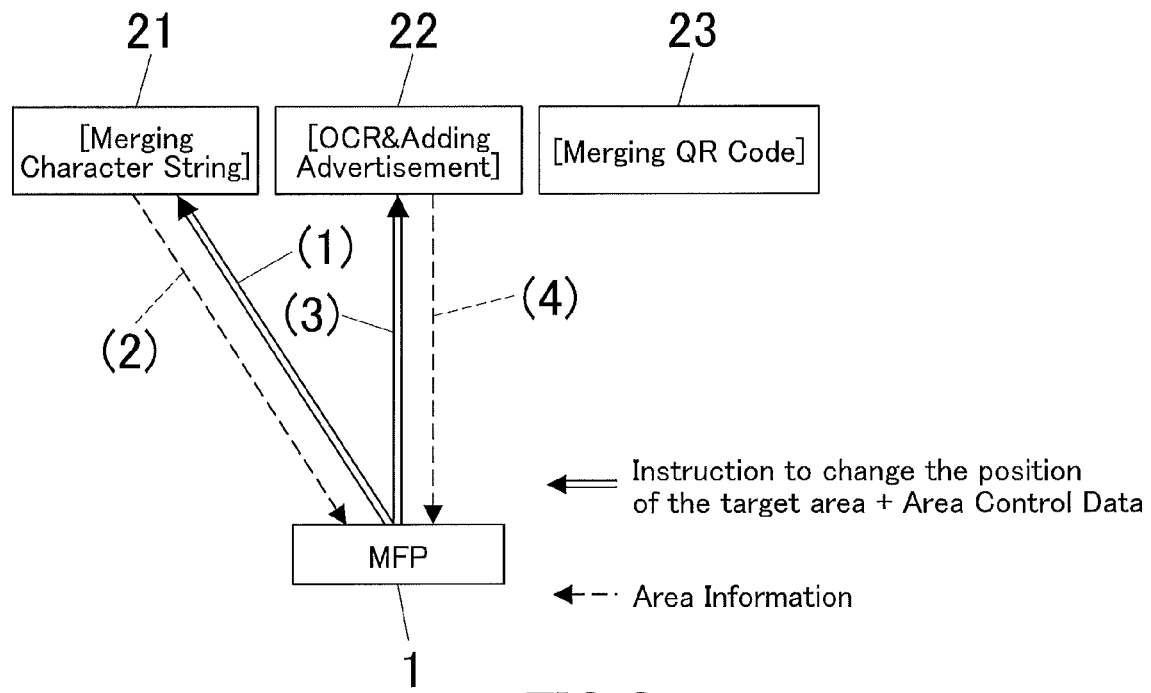
FIG. 9 is a view to explain a procedure to resolve the overlapping target areas.

Receiving such an instruction, the image processing server 22 changes and adjusts the position of the target area R2 (for an advertising banner), and again transmits area information indicating the adjusted target area, the target area R2 at a different position, to the image forming apparatus 1 (see a dashed arrow (4) of FIG. 9).

Figure 10:
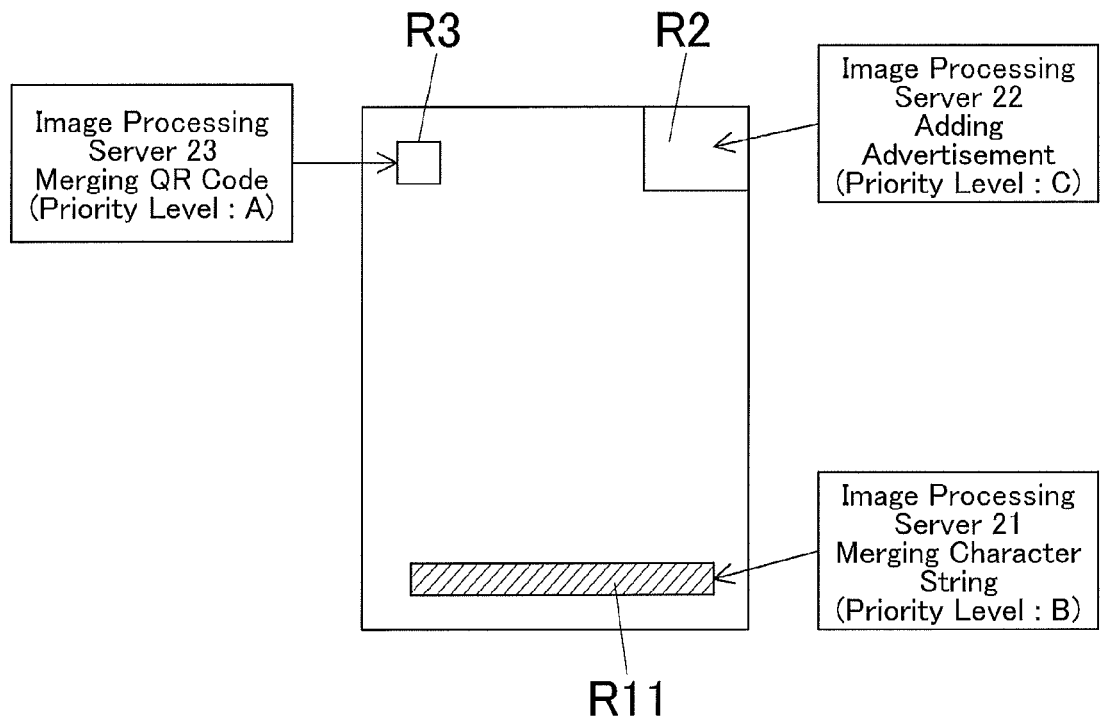
FIG. 10 illustrates a resolved situation where now the target areas of the image processing servers are not overlapping each other.

Such a series of operations is repeated until it is judged that the target areas of the image processing servers 21-23 are not overlapping each other as illustrated in FIG. 10.

Figures 11, 12, 13:
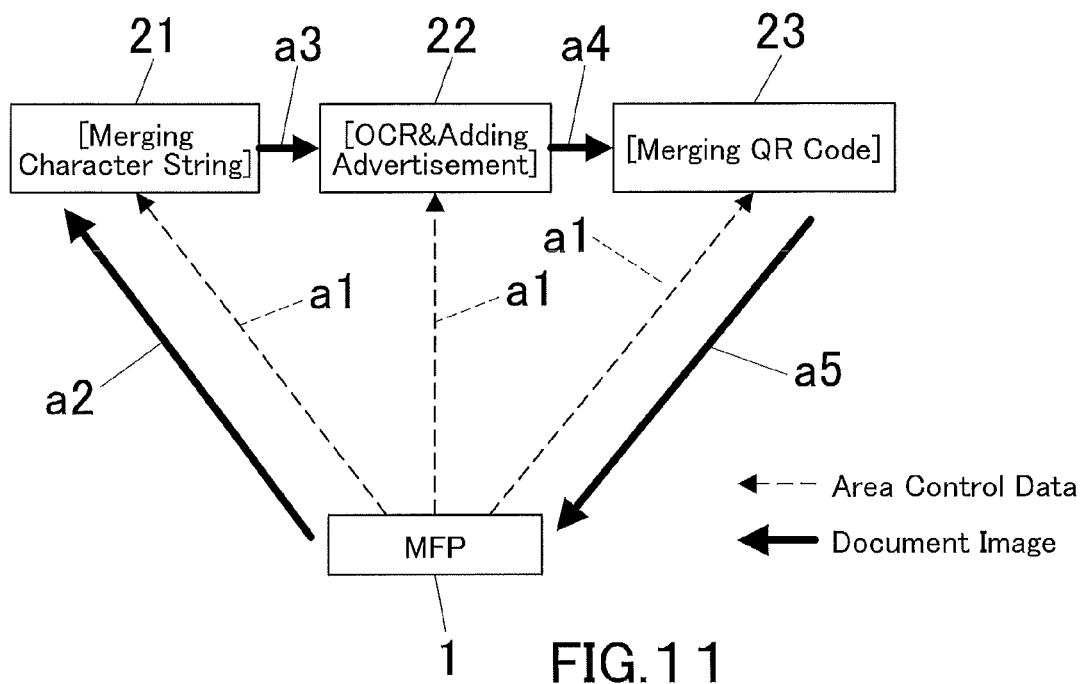
FIG. 11 illustrates this system with arrows indicating the send-to addresses and the order of transferring area administration data and target image data.
FIG. 12 is a view illustrating an example of a table of area control data.
FIG. 13 is a view illustrating an example of a table of service information.

The image forming apparatus 1 confirms the target areas determined by the image processing servers 21-23 to be not overlapping each other, as area control data, and transmits the area control data to the image processing servers 21-23 as indicated by a dashed arrow a1 of FIG. 11. The area control data transmitted to the image processing servers 21-23 may display the target areas of the image processing servers 21-23 separately and individually in different pictures, or may indicate them all collectively in one picture.

FIG. 12 illustrates one example of a table of the area control data indicating the confirmed target areas. The table is composed of page numbers and coordinates representing target areas as shown in FIG. 12. There may be multiple target areas.

In this mode of implementation, the image forming apparatus 1 is configured to transmit area control data to the image processing servers 21-23, along with service information.

FIG. 13 illustrates one example of a table of service information. In this example, service information is composed of: types of image processing services; the order of the image processing services; and the addresses of the transfer ports of the image processing servers 21-23 in charge of the image processing services. The image processing servers 21-23 transmit a document image to the next address according to the order indicated by the service information.

As indicated by an arrow a2 of FIG. 11, the image forming apparatus 1 transmits a document image to the image processing server 21 in charge of the image processing service 1. The image forming apparatus 1 may transmit either or both of area control data and service information to the image processing server 21 via or not via the transfer route that the image forming apparatus 1 uses for transmitting the document image, so that either or both of them will be transferred to the image processing server 22 then image processing server 23 according to the order of the image processing services.

Receiving the area control data from the image forming apparatus 1, the image processing server 21 performs the image processing service 1, i.e. a code merging operation, on the target area R11 in the document image, indicated by the area control data. More specifically, in this code merging operation, a target character string such as a security code or a copy tracking code; a target image including a character string; or the like is merged to the document image.

After the code merging operation, the transaction processor 219 processes a transaction to charge for the finished operation. And as indicated by an arrow a3 of FIG. 11, the image processing server 21 transfers the document image obtained by the code merging operation, to the image processing server 22 in charge of the image processing service 2, according to the order of the image processing services indicated by the service information received from the image forming apparatus 1.

In this mode of implementation, the image processing server 21 performs a code merging operation on a document image having just been received from the image forming apparatus 1. Alternatively, the image processing server 21 may perform a code merging operation on a document image having previously been received from the image forming apparatus 1 in response to a request for area information and stored on itself. After performing image processing, the image processing server 21 transfers the document image to the image processing server 22.

Receiving the document image, the image processing server 22 performs the image processing service 2, i.e. a character recognition operation and ad-giving operation, on the target area R2 in the document image, indicated by the area control data. The area control data indicates the target areas to be subjected to image processing by the image processing servers 21-23, which are confirmed to be not overlapping each other. This means that now there is no possibility that the document image obtained by the image processing service 1 might be adversely affected by the image processing service 2, and the document image therefore will result in being perfectly suited for the user's original intention.

After the character recognition operation and ad-giving operation, the image processing server 22 processes a transaction to charge for the finished operations.

Also after the character recognition operation and ad-giving operation, as indicated by an arrow a4 of FIG. 11, the image processing server 22 transfers the document image obtained by the operations, to the image processing server 23 in charge of the image processing service 3, according to the order of the image processing services indicated by the service information.

Similar to the case of the image processing server 22, receiving the document image, the image processing server 23 performs the image processing service 3, i.e. gives a target data object which is a two-dimensional code such as a QR code, to the target area R3 in the document image, indicated by the area control data. After that, the image processing server 23 processes a transaction to charge for the finished operation.

Also after the code merging operation, the image processing server 23 identifies itself as the image processing server in charge of the final image processing service according to the service information originated from the image forming apparatus 1. And as indicated by an arrow a5 of FIG. 11, the image processing server 23 transfers the document image obtained by all the image processing operations, to the image forming apparatus 1.

Receiving the document image and the like, the image forming apparatus 1 prints the document image by the printer 13 or transfers it to the terminal 31 or 32 according to user instruction.

Hereinafter, the operations of the image forming apparatus 1, and the image processing servers 21-23 will be further described with reference to some flowcharts.

The image forming apparatus 1 performs all operations under control of the CPU 121 according to operation programs stored on the program ROM 125 as described above.

Figure 14:
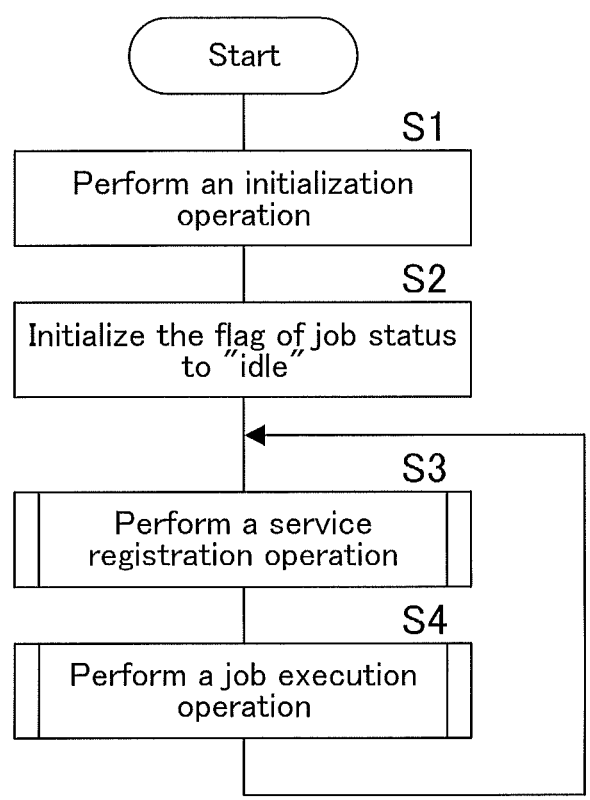
FIG. 14 is a flowchart representing a main processing routine of the image forming apparatus.

As illustrated in FIG. 14, when being provided with power, the image forming apparatus 1 performs an initialization operation, for example initializes the hardware and the like (Step S1). Subsequently, 'job status' representing the status of a job is initialized to 'idle' (Step S2). Some image processing services are registered on the image processing servers 21-23 (Step S3), and a job to perform a series of image processing services is executed (Step S4). And the main processing routine returns to Step S3 to repeat Steps S3 and S4.

Figure 15:
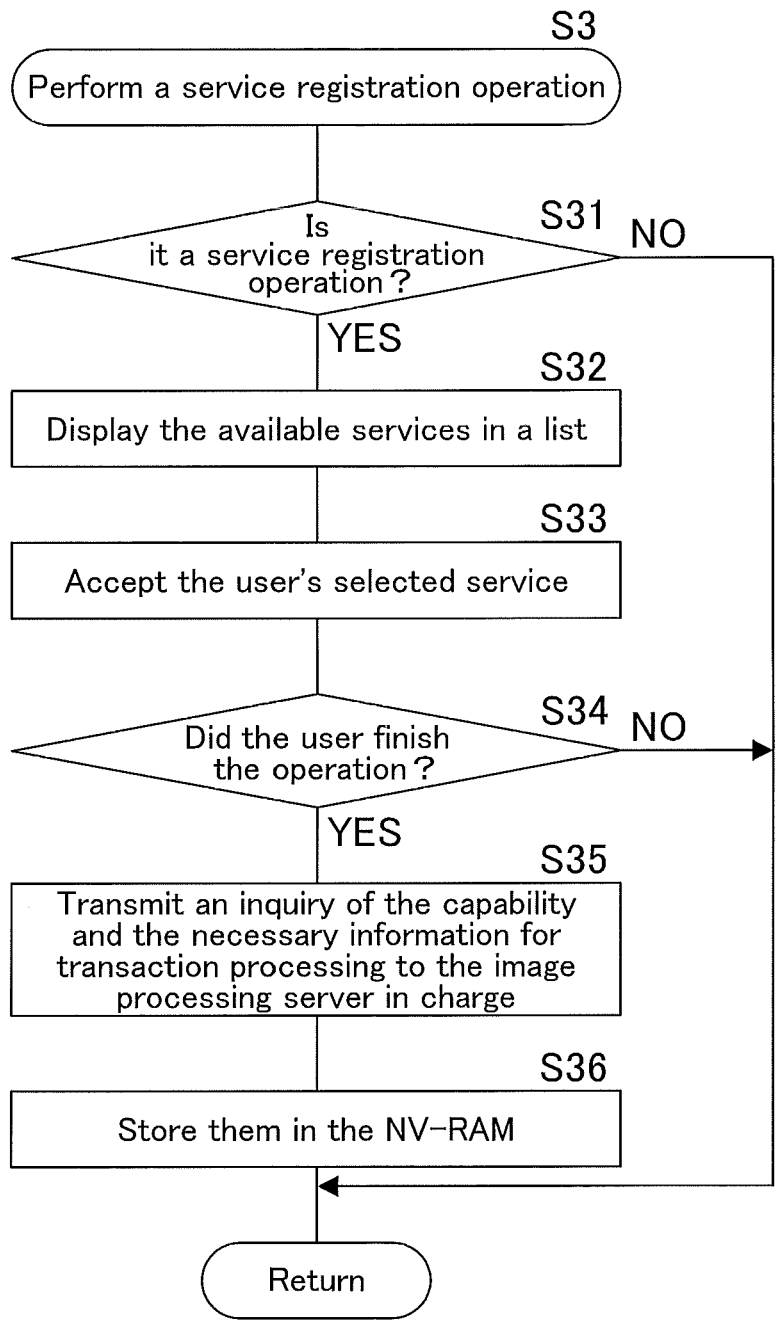
FIG. 15 is a flowchart representing a sub processing routine corresponding to a service registration operation (Step S3) in FIG. 14.

FIG. 15 is a flowchart representing a sub processing routine corresponding to a service registration operation (Step S3) in FIG. 10. It should be noted that an administrator user or the like is required to preliminarily register the available image processing services on the image forming apparatus 1.

In Step S31, it is judged whether or not what is intended via the operation panel 128 is a service registration operation. If it is not a service registration operation (NO in Step S31), the sub processing routine returns to the main processing routine. If it is a service registration operation (YES in Step S31), the available image processing services having been registered on the body appear in a list (the registered items can be updated in a different process). The user selects a desirable image processing service, then the selected image processing service is accepted in Step S33. And according to user manipulation, it is judged whether or not the selection is finished in Step S34. If the selection is not finished (NO in Step S34), the sub processing routine returns to the main processing routine. If the selection is finished (YES in Step S34), an inquiry of the capability of the selected image processing service is transmitted to the image processing server in charge in Step S35, and the obtained information is stored on the NV-RAM 129 in Step S36.

Figure 16:
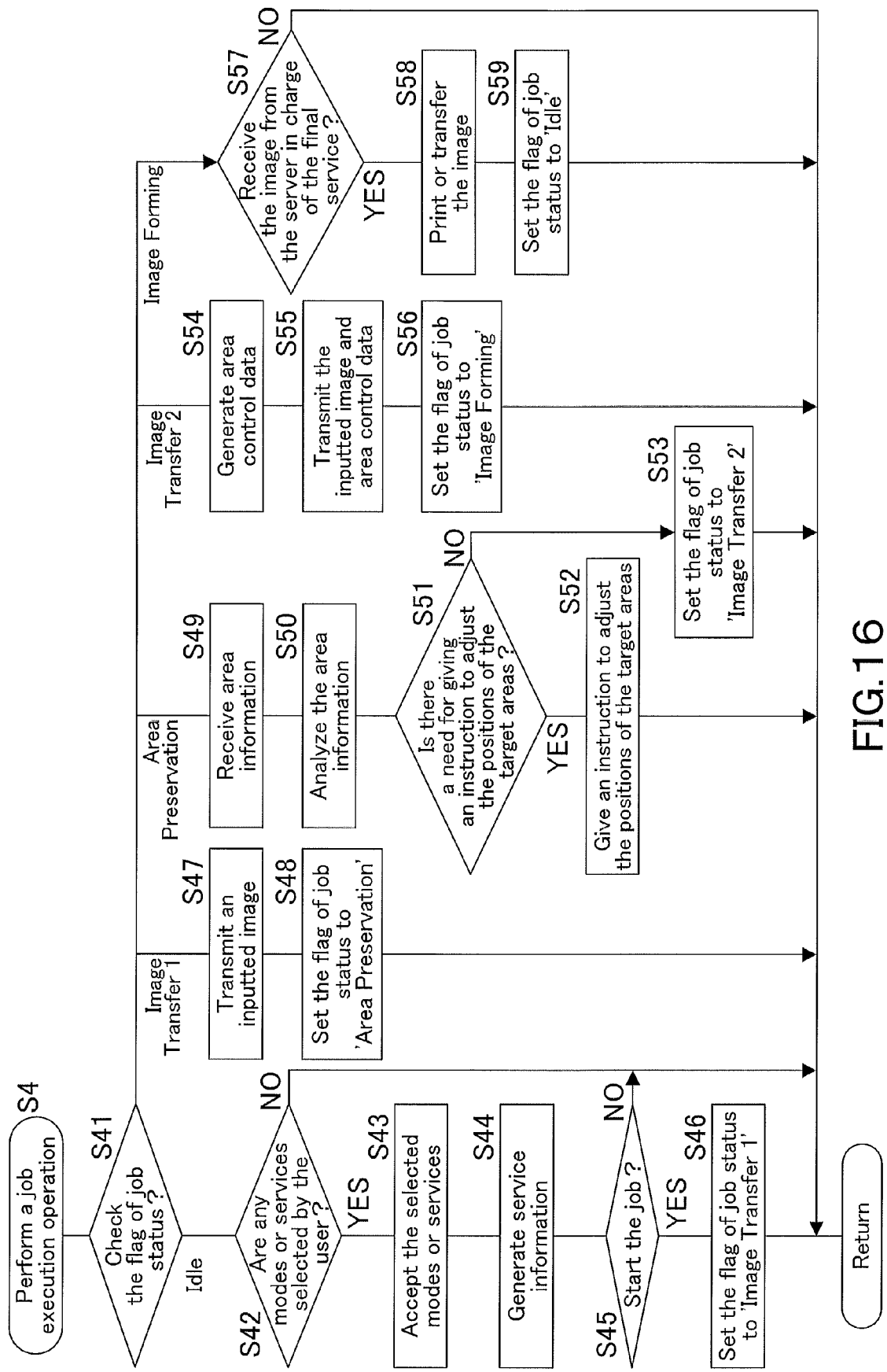
FIG. 16 is a flowchart representing a sub processing routine corresponding to a job execution operation (Step S4) in FIG. 14.

FIG. 16 is a flowchart representing a sub processing routine to select a series of image processing services and execute a job to perform it, corresponding to the job execution operation (Step S4) in FIG. 14.

The flag of 'job status' is examined, and the sub processing routine proceeds to different steps depending on the job status: 'idle', 'image transfer 1, 'area preservation', 'image transfer 2', or 'image forming', in Step S41.

If the flag of 'job status' is 'idle' in Step S41, it is judged in Step S42 whether or not any modes or image processing services are selected by the user via the operation panel 128. If any modes or image processing services are selected (NO in Step S42), the sub processing routine returns to the main processing routine. If any modes or image processing services are selected (YES in Step S42), the modes or image processing services selected via the operation panel 128 are accepted in Step S43, and service information is generated in Step S44.

And in Step S45, it is judged whether or not the Start key is pressed by the user, in other words, there is an instruction to start the job. If there is not such an instruction (NO in Step S45), the sub processing routine returns to the main processing routine. If there is such an instruction (YES in Step S45), the flag of 'job status' is set to 'image transfer 1' in Step S46. Then the sub processing routine returns to the main processing routine.

If the flag of 'job status' is 'image transfer 1' in Step S41, the sub processing routine proceeds to Step S47, in which a document image inputted to the image forming apparatus 1 is transmitted to the image processing servers 21-23, along with a request for area information including target areas to be subjected to image processing. The document image inputted thereto may be an image read out from a document by the scanner 11 or a print image received from the terminal 31 or 32.

After transmission of the document image, the flag of 'job status' is set to 'area preservation' in Step S48. Then the sub processing routine returns to the main processing routine.

If the flag of 'job status' is 'area preservation' in Step S41, area information is obtained from the image processing servers 21-23 in Step S49, and the obtained area information is analyzed in Step S50.

And in Step S51, it is judged whether or not the target areas of the image processing servers 21-23 are overlapping each other, i.e. there is a need for giving an instruction to change and adjust the positions thereof. If there is such a need (YES in Step S51), an instruction to change and adjust the positions of the target areas is given in Step S52, then the sub processing routine returns to the main processing routine. If there is no such need (NO in Step S51), the flag of 'job status' is set to 'image transfer 2' in Step S53. Then the sub processing routine returns to the main processing routine.

If the flag of 'job status' is 'image transfer 2' in Step S41, the sub processing routine proceeds to Step S54, in which area control data indicating the confirmed target areas is generated on the image processing servers 21-23. Subsequently, the sub processing routine proceeds to Step S55, in which the area control data generated in Step S54 is transmitted to the image processing servers 21-23 and the document image inputted to the image forming apparatus 1 is transmitted to the image processing server 21 in charge of the image processing service 1. And the flag of 'job status' is set to 'image forming' in Step S56, then the sub processing routine returns to the main processing routine.

If the flag of 'job status' is 'image forming' in Step S41, the sub processing routine proceeds to Step S54, in which it is judged whether or not a document image is received from the image processing server 23 in charge of the final image processing service.

If the document image is not received therefrom (NO in Step S57), the sub processing routine returns to the main processing routine. If the document image is received therefrom (YES in Step S57), the received document image is printed by the printer 13 or alternatively transferred to the terminal 31 or 32 according to user instruction in Step S58. Subsequently, the flag of 'job status' is set to 'idle' in Step S59, then the sub processing routine returns to the main processing routine.

FIGS. 17 to 20 are flowcharts to further describe the operations of the image processing servers 21-23. The image processing servers 21-23 perform all operations under control of their own CPUs 211 according to operation programs stored on their own recording mediums such as the ROMs 212 or the memories 214.

Figure 17:
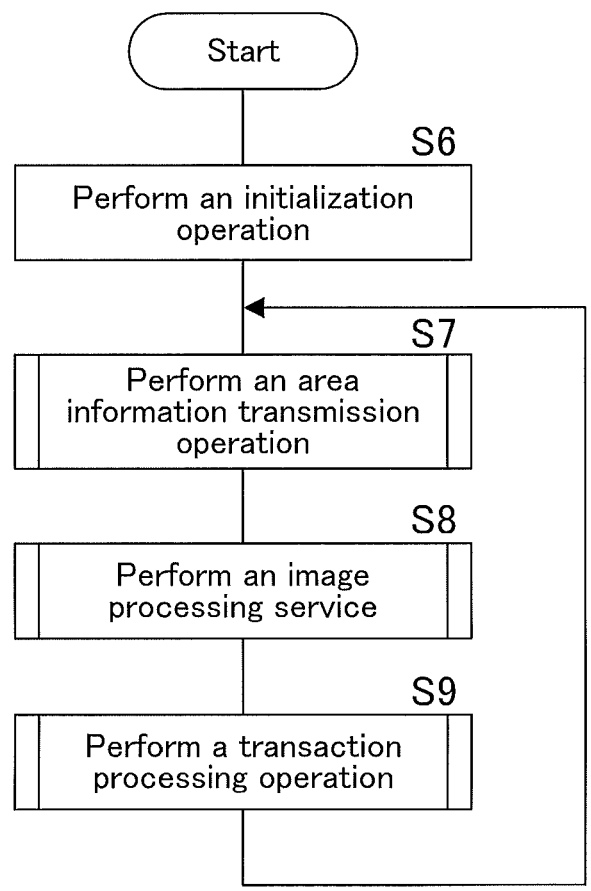
FIG. 17 is a flowchart representing a main processing routine of the image processing servers.

FIG. 17 is a flowchart representing a main processing routine of the image processing servers 21-23.

The image processing servers 21-23, each performs an initialization operation (Step S6), an area information transmission operation (Step S7), and a transaction processing operation (Step S9). Here, the image processing servers 21-23 may be configured to perform the image processing operation (Step S8) and the transaction processing operation (Step S9) in a different process.

Figure 18:
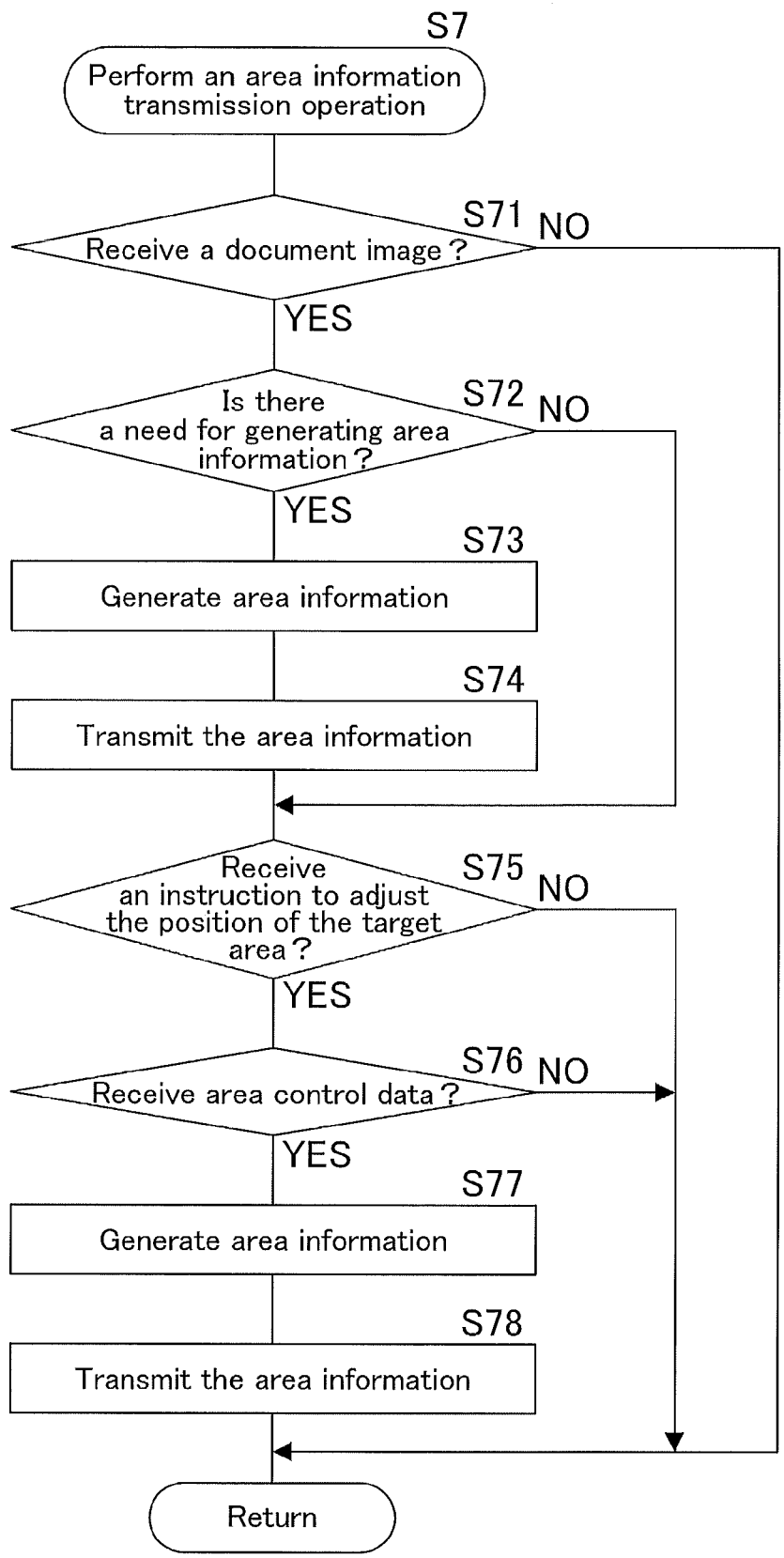
FIG. 18 is a flowchart representing a sub processing routine corresponding to an area information transmission operation (Step S7) in FIG. 17.

FIG. 18 is a flowchart representing a sub processing routine corresponding to the area information transmission operation (Step S7) in FIG. 17.

In Step S71, it is judged whether or not a document image is received from the image forming apparatus 1. If it is not received therefrom (NO in Step S71), the sub processing routine returns to the main processing routine. If the document image is received therefrom (YES in Step S71), then it is judged in Step S72 whether or not there is a need for generating area information. If there is no such need (NO in Step S72), the sub processing routine proceeds to Step S75. If there is a need for generating area information, i.e. if the document image is partially subjected to image processing, not entirely subjected to image processing (YES in Step S72), area information is generated in Step S73. Here, each of the image processing servers holds its own default target area set in advance.

And the generated area information is transmitted to the image forming apparatus 1 in Step S74, and the sub processing routine proceeds to Step S75. In Step S75, it is judged whether or not an instruction to adjust (change) the positions of the target areas is received. If no such instruction is received (NO in Step S75), the sub processing routine immediately returns to the main processing routine. If such an instruction is received (YES in Step S75), then it is further judged in Step S76 whether or not area control data is received. If it is received (YES in Step S76), area information is generated again in Step S77, and the generated area information is transmitted to the image forming apparatus 1 in Step S78.

If area control data is not received (NO in Step S76), the sub processing routine immediately returns to the main processing routine.

Figure 19:
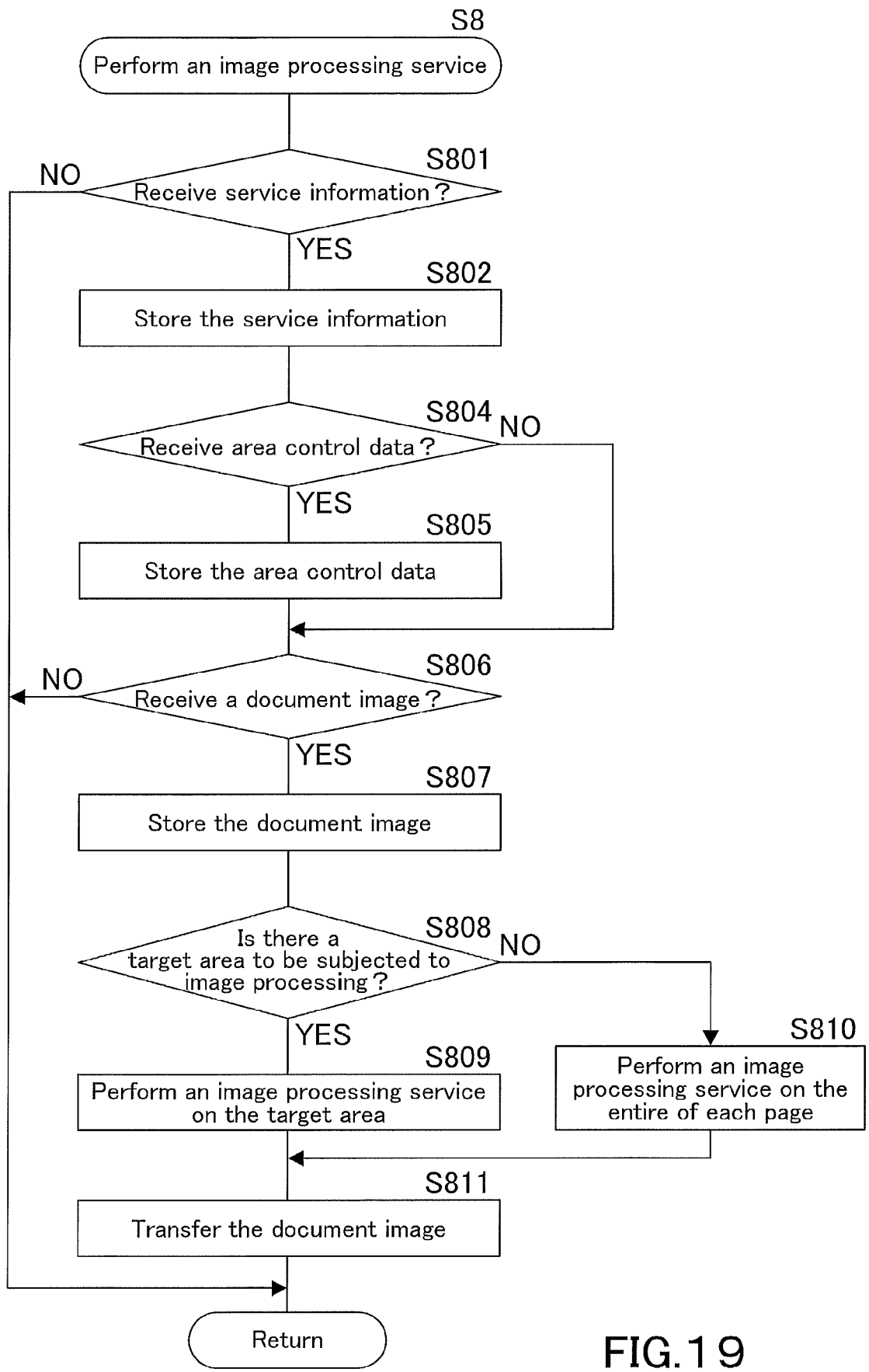
FIG. 19 is a flowchart representing a sub processing routine corresponding to an image processing operation (Step S8) in FIG. 17.

FIG. 19 is a flowchart representing a sub processing routine corresponding to the image processing operation (Step S8 in FIG. 17).

In Step S801, it is judged whether or not service information is received from the image forming apparatus 1. If it is received (YES in Step S801), the detail of service information is stored in Step S801, and the sub processing routine proceeds to Step S804. If it is not received (NO in Step S801), the sub processing routine returns to the last sub processing routine.

In Step S804, it is judged whether or not area control data is received in Step S804. If it is received (YES in Step S804), the detail of the area control data is stored in Step S805, and the sub processing routine proceeds to Step S806. If area control data is not received (NO in Step S804), the sub processing routine proceeds directly to Step S806.

In Step S806, it is judged whether or not a document image is received, and if it is not received (NO in Step S806), the sub processing routine returns to the main processing routine. If a document image is received (YES in Step S806), the document image is stored in Step S807, and then it is judged in Step S807 whether or not there is a target area to be subjected to image processing according to the area control data. If there is a target area to be subjected to image processing (YES in Step S808), the target area in the document image is subjected to image processing in Step S809. Then the sub processing routine proceeds to Step S811. If there is not a target area to be subjected to image processing (NO in Step S808), the entire of each page of the document image are subjected to image processing in Step S810. Then the sub processing routine proceeds to Step S811.

The document image obtained by the present image processing service is transferred to the image processing server in charge of the next image processing service in Step S811, or alternatively it is transferred to the image forming apparatus 1 in Step S811 if the present image processing service was the final one. Then the sub processing routine returns to the main processing routine.

Figure 20:
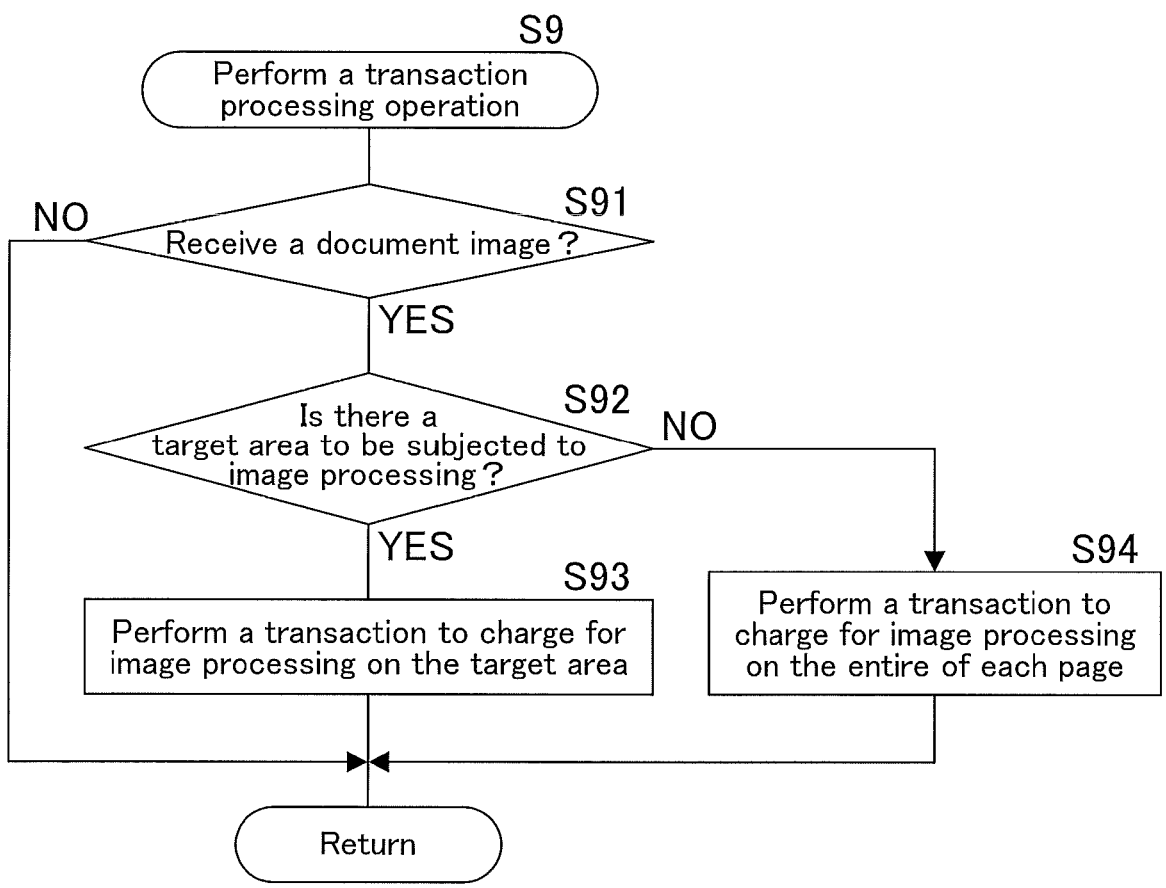
FIG. 20 is a flowchart representing a sub processing routine corresponding to a transaction processing operation (Step S9) in FIG. 17.

FIG. 20 is a flowchart representing a sub processing routine corresponding to the transaction processing operation (Step S9) in FIG. 17.

In Step S91, it is judged whether or not a document image is received, and if it is not received (NO in Step S91), the sub processing routine immediately returns to the main processing routine. If it is received (YES in Step S91), then it is judged in Step S92 whether or not there is a target area to be subjected to image processing. If there is a target area to be subjected to image processing (YES in Step S92), a transaction to charge for image processing on the target area in the document image is performed in Step S93, then the sub processing routine returns to the main processing routine. If there is not a target area to be subjected to image processing (NO in Step S92), a transaction to charge for image processing on the entire of each page of the document image is subjected to image processing in Step S94, then the sub processing routine returns to the main processing routine.

The mode of implementing the present invention has been described in the foregoing specification, which does not mean that the present invention shall be construed as limited to the particular forms disclosed.

For example, in this mode of implementation, the image forming apparatus 1 is configured to transmit a document image to the image processing servers 21-23 to obtain area information in return therefrom; instruct the image processing servers with lower priority levels to adjust the positions of their target areas if it is judged that the target areas are overlapping each other based on the area information; and confirm the target areas determined by the image processing servers 21-23 to be not overlapping each other, as area control data. The image forming apparatus 1 may be configured to specify target areas of the image processing servers 21-23 by itself, instead of obtaining area information from the image processing server 24.

Figure 21:
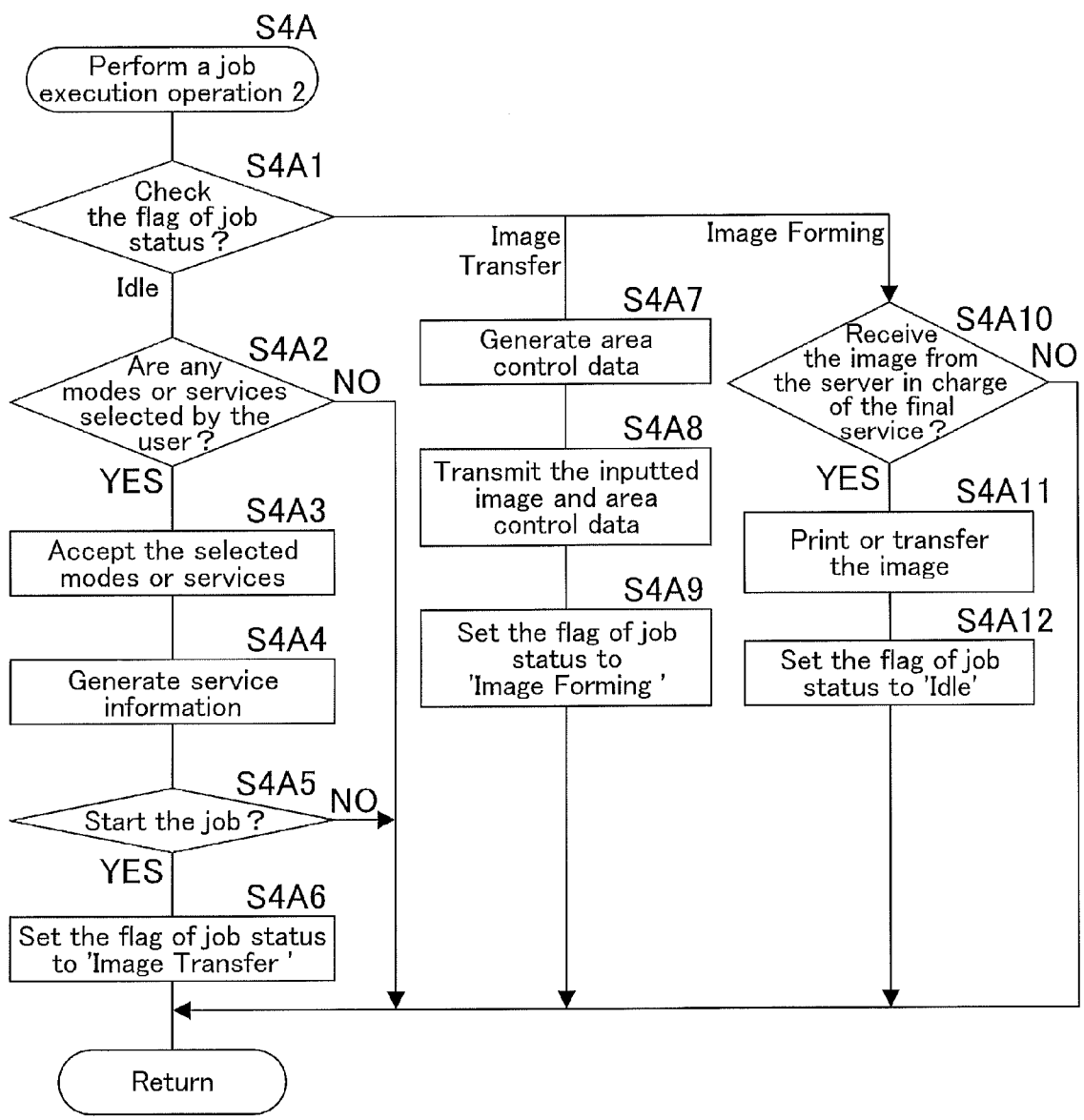
FIG. 21 relates to another mode of implementing the present invention, corresponding to the flowchart in FIG. 16.

FIG. 21 is a flowchart to explain the operations performed in this case. FIG. 21 illustrates a sub processing routine corresponding to the job execution operation (Step S4) in FIG. 14, which means that it corresponds to FIG. 16 but relates to another mode of implementing the present invention.

The flag of 'job status' is examined, and the sub processing routine proceeds to different steps depending on the job status: 'idle', 'image transfer', or 'image forming' in Step S4A1.

If the flag of 'job status' is 'idle' in Step S4A1, it is judged in Step S4A2 whether or not any modes or a series of image processing services are selected by the user via the operation panel 128. If any modes or image processing services are selected (NO in Step S4A2), the sub processing routine returns to the main processing routine. If any modes or image processing services are selected (YES in Step S4A2), the modes or image processing services selected via the operation panel 128 are accepted in Step S4A3, and service information is generated in Step S4A4.

And in Step S4A5, it is judged whether or not the Start key is pressed by the user, in other words, there is an instruction to start the job. If there is not such an instruction (NO in Step S4A5), the sub processing routine returns to the main processing routine. If there is such an instruction (YES in Step S4A5), the flag of 'job status' is set to 'image transfer' in Step S4A6, then the sub processing routine returns to the main processing routine.

If the flag of 'job status' is 'image transfer' in Step S4A1, the sub processing routine proceeds to Step S4A7, in which area control data indicating target areas to be subjected to image processing by the image processing servers 21-23 is generated. The target areas indicated by the area control data generated in this step are not overlapping each other.

Subsequently, the sub processing routine proceeds to Step S4A8, in which the area control data generated in Step S4A7 is transmitted to the image processing servers 21-23 and the document image inputted to the image forming apparatus 1 is transmitted to the image processing server 21 in charge of the image processing service 1. And the flag of 'job status' is set to 'image forming' in Step S4A9, then the sub processing routine returns to the main processing routine.

If the flag of 'job status' is 'image forming' in Step S4A1, the sub processing routine proceeds to Step S4A10, in which it is judged that a document image is received from the image processing server 23 in charge of the final image processing service.

If the document image is not received therefrom (NO in Step S4A10), the sub processing routine returns to the main processing routine. If the document image is received therefrom (YES in Step S4A10), the received document image is printed by the printer 13 or alternatively transferred to the terminal 31 or 32 according to user instruction in Step S4A11. Subsequently, the flag of 'job status' is set to 'idle' in Step S4A12, then the sub processing routine returns to the main processing routine.

Hereinafter, the description of the operations performed by the image processing servers 21-23 will be omitted because it is the same as those provided above with reference to FIGS. 17-20.

In this mode of implementation, the area control data indicates the target areas to be subjected to image processing by the image processing servers, which are confirmed to be not overlapping each other. This means that now there is no possibility that the document image obtained by an image processing service might be adversely affected by the next image processing service, and this therefore can resolve the problem that the document image results in being totally against the user's original intention.

In these modes of implementation having been described above, area control data indicates target areas to be subjected to image processing by the image processing servers 21-23, which are confirmed to be not overlapping each other. Alternatively, it may indicate areas permitted to be subjected to image processing and/or prohibited from being subjected to image processing by the image processing servers 21-23, which are confirmed to be not overlapping each other.

For example, in these modes of implementation having been described above, the image processing servers 21-23 are configured to transfer a document image to the next address according to the order of the image processing services which is indicated by service information received from the image forming apparatus 1. Alternatively, the image processing servers 21-23 may be configured to transfer a document image to the image forming apparatus 1 serving as a mediation server to mediate the exchange of information so that the image forming apparatus 1 will further transfer it to the next address, as illustrated in FIG. 22.

Figure 22:
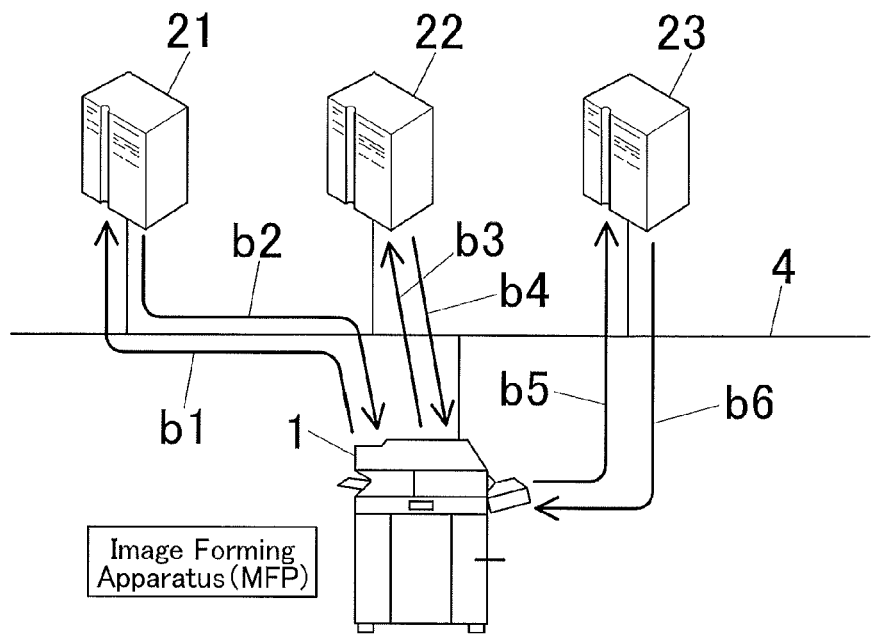
FIG. 22 is a view to explain the image processing system in which image data is transferred to the next address via the image forming apparatus serving as a relay machine.

More specifically, the image forming apparatus 1 transfers a target document image to the image processing servers 21 in charge of the image processing service 1 (an arrow b1 of FIG. 22), and the image processing server 21 performs the image processing service 1 on its own target area indicated by the area control data and transfers the image data obtained by the image processing service 1 to the image forming apparatus 1 (an arrow b2 of FIG. 22).

Receiving the document image from the image processing server 21, the image forming apparatus 1 transfers it to the image processing server 22 in charge of the image processing service 2 (an arrow b3 of FIG. 22). And the image processing server 22 performs the image processing service 2 on its own target area indicated by the area control data and transfers the image data obtained by the image processing service 2 to the image forming apparatus 1 (an arrow b4 of FIG. 22). Receiving the document image from the image processing server 22, the image forming apparatus 1 transfers it to the image processing server 23 in charge of the image processing service 3 (an arrow b5 of FIG. 22). And the image processing server 23 performs the image processing service 3 on its own target area indicated by the area control data and transfers the image data obtained by the image processing service 3 to the image forming apparatus 1 (an arrow b6 of FIG. 22).

In this way as described above, by serving as a mediation server to mediate the exchange of information, the image forming apparatus 1 does not need to generate service information nor to transmit generated service information to the image processing servers 21-23.

Figure 23:
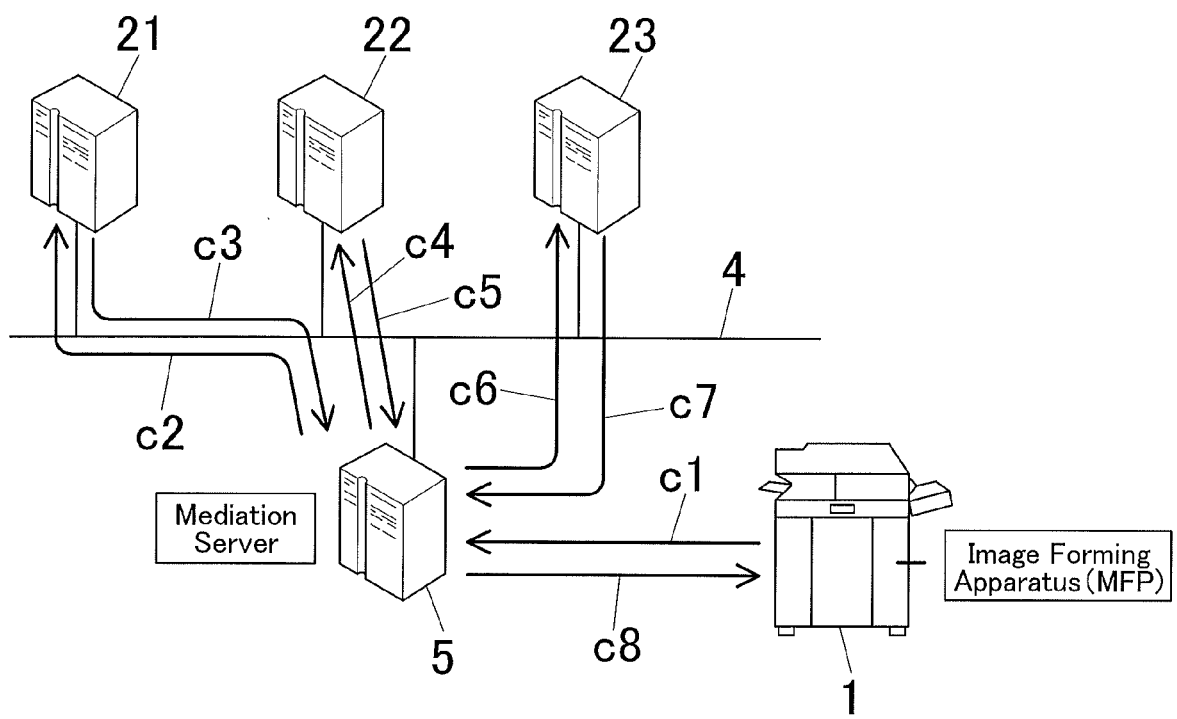
FIG. 23 is a view illustrating a configuration of the image processing system, in which a mediation server for controlling each of the image processing servers is placed between the image forming apparatus and the group of the image processing servers.

Further alternatively, the image processing servers 21-23 may be configured to transfer a document image to a mediation server 5 to mediate the exchange of information, which is additionally provided between the image forming apparatus 1 and a group of the image processing servers 21-23, so that the mediation server 5 will control to which address to transfer the document image among the image processing servers 21-23, as illustrated in FIG. 23. In this mode of implementation, the image forming apparatus 1 transmits a document image, area control data, and service information to the mediation server 5 (an arrow c1 of FIG. 23), and the mediation server 5 transfers the area control data and service information to the image processing servers 21-23. As for the document image, the mediation server 5 repeatedly exchanges the document image with the image processing servers 21-23. After the final image processing service, the image processing server 23 transfers the document image to the mediation server 5, and the mediation server 5 transfers the document image to the image forming apparatus 1 (an arrow c8 of FIG. 23).

In this way as described above, the image forming apparatus 1 does not need to transmit a document image and the like to the image processing servers 21-23, and the image forming apparatus 1 therefore can have a more simple configuration excluding the transfer function.

Figure 24:
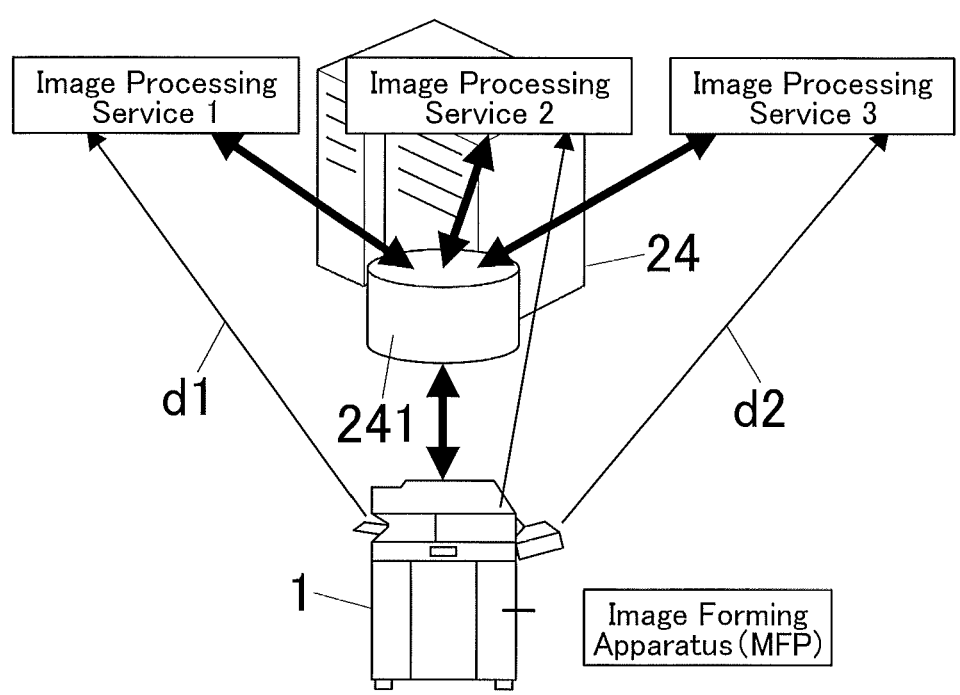
FIG. 24 is a view illustrating a configuration of the image processing system, in which one image processing server provides multiple image processing services.
Figure 25A:
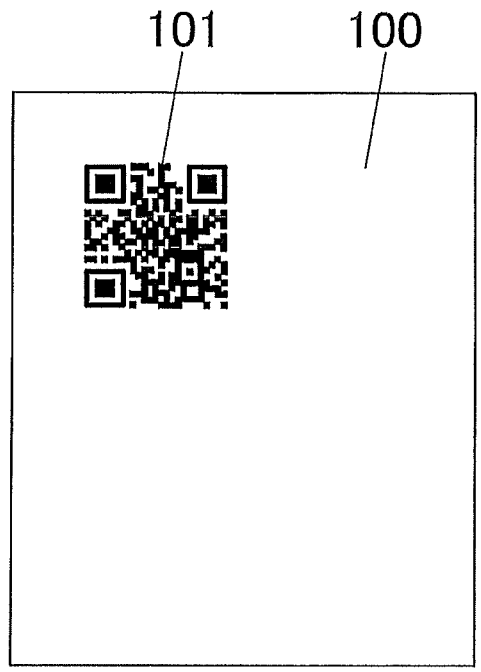
FIG. 25 is a view to explain the problems with the conventional technologies.
Figure 25B:
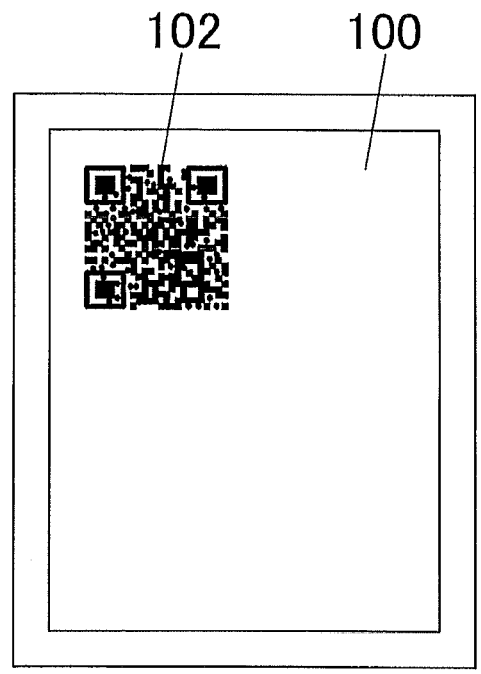
Figure 25C:
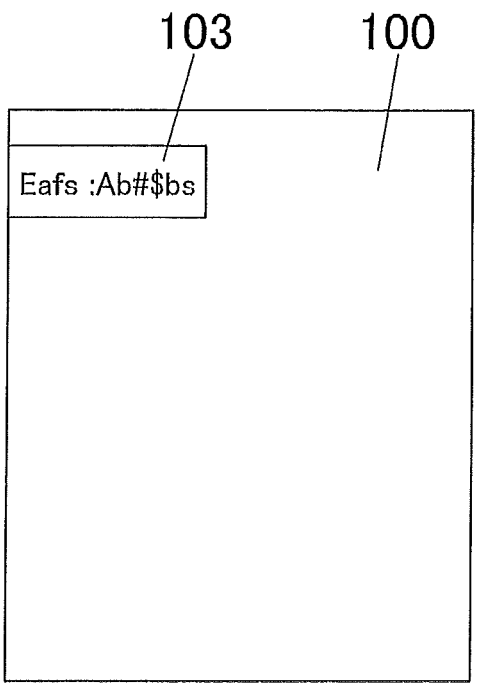

Furthermore, in the modes of implementation having been described above, a plurality of image processing servers, the image processing servers 21-23 are in charge of their own and different image processing services. Alternatively, as illustrated in FIG. 24, one image processing server, an image processing server 24 may be in charge of all the image processing services 1-3. In this mode of implementation, the image forming apparatus 1 transmits a document image to the image processing server 24 (an arrow d2 of FIG. 24), and the image processing server 24 performs all the image processing services 1-3 on the document image according to the information stored on a storage 241 of the image processing server 24. Here in this mode of implementation, just like in these modes of implementation where a plurality of image processing servers are employed as illustrated in FIG. 1, the image forming apparatus 1 obtains area information from the image processing server 24, and if the target areas are overlapping each other, instructs the image forming apparatus 24 to adjust the positions of the target areas, so that the image processing server 24 can successfully perform the image processing services according to area control data; or alternatively the image forming apparatus 1 permits target areas to be subjected to image processing and/or prohibits target areas from being subjected to image processing, instead of obtaining area information from the image processing server 24, so that the image processing server 24 can successfully perform the image processing services according to area control data. This will eliminate the possibility that a document image obtained by an image processing service might be adversely affected by the next image processing service.

After the final image processing service, the image processing server 24 transfers the document image to the image forming apparatus 1 (an arrow d2 of FIG. 24).

In this way as described above, one image processing server, the image processing server 24 can successfully perform a plurality of image processing operations, which leads to enhancement of the speed of performance.

The image processing servers 21-23 may perform a transaction processing operation by an electric payment option. Instead of the image processing servers 21-23, the transaction processing apparatus 6 connected to the image forming apparatus 1 as illustrated in FIG. 1 may be configured to perform a transaction processing operation.

The image processing servers 21-23 are configured to store on themselves information of the priority levels defined for their own target areas, but the image forming apparatus 1 may be configured to store the information on itself instead of the image processing servers 21-23.

The present invention of the subject application having been described above may be applied to the following modes.

[1] An image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image forming apparatus comprising:
  an area information obtainer which obtains area information indicating target areas to be subjected to image processing by the image processing servers, from the image processing servers by outputting thereto the target image data;
  a judgment portion which judges whether or not the target areas to be subjected to image processing by the image processing servers are overlapping each other, based on the area information obtained by the area information obtainer;

a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and a transmitter which transmits information of the target areas which are determined by the judgment portion to be not overlapping each other, the image processing servers each comprising:

a target area adjuster which adjusts the positions of the target areas according to instructions from the image forming apparatus; and an image processor which performs an image processing service on the target image data based on the information of the target areas determined to be not overlapping each other, which is received from the image forming apparatus.

[2] The image processing system as recited in the aforementioned item [1], wherein at least one of the image processing servers performs an operation to merge a target data object to the target image data as its own image processing service.

[3] The image processing system as recited in the aforementioned item [2], wherein the target data object to be merged to the target image data is a character string.

[4] The image processing system as recited in the aforementioned item [2], wherein the target data object to be merged to the target image data is an image including a character string.

[5] The image processing system as recited in the aforementioned item [2], wherein the target data object to be merged to the target image data is a barcode or two-dimensional code representing a certain code.

[6] The image processing system as recited in the aforementioned item [1], wherein the image forming apparatus further comprises an order information generator generates order information defining the order of the image processing services to be performed by the image processing servers, and the image processing servers transfer the target image data among themselves according to the order defined by the order information generated by the order information generator to cooperatively perform the image processing services in that order.

[7] The image processing system as recited in the aforementioned item [1], wherein every single of the image processing servers returns the target image data to the image forming apparatus after performing its own image processing service, and the image forming apparatus transfers the target image data received therefrom, to a particular one of the image processing servers according to the order.

[8] The image processing system as recited in the aforementioned item [1], wherein:

a mediation server is connected between the image forming apparatus and a group of the image processing servers via the network; and every single of the image processing servers returns the target image data to the mediation server after performing its own image processing service, and the mediation server transfers the target image data received therefrom, to a particular one of the image processing servers according to the order.

[9] An image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image forming apparatus comprising:

an area controller which permits areas in the target image data, to be subjected to image processing by the image processing servers and/or prohibits areas in the target image data, from being subjected to image processing by the image processing servers; and a transmitter which transmits information of the areas permitted by the area controller and/or the areas prohibited by the area controller, to the image processing servers, the image processing servers each comprising:

an image processor which performs an image processing service on the permitted areas and/or the target image data excluding the prohibited areas, based on the information of the permitted areas and/or the prohibited areas, which is received from the image forming apparatus.

[10] An image processing system comprising: an image forming apparatus which outputs target image data; and one image processing sever which performs a series of image processing services in a predetermined order on the target image data originated from the image forming apparatus, while being connected to the image forming apparatus via a network, the image forming apparatus comprising:

an area information obtainer which obtains area information indicating target areas to be subjected to image processing by the image processing server, from the image processing server by outputting thereto the target image data;

a judgment portion which judges whether or not the target areas to be subjected to image processing by the image processing server are overlapping each other, based on the area information obtained by the area information obtainer;

a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and a transmitter which transmits information of the target areas which are determined by the judgment portion to be not overlapping each other, to the image processing server, the image processing server comprising:

a target area adjuster which adjusts the positions of the target areas according to instructions from the image forming apparatus;

a transmitter which transmits information of the target areas which are before and after adjusting their positions by the target area adjuster, to the image forming apparatus; and an image processor which performs an image processing service on the target image data based on the information of the target areas determined to be not overlapping each other, which is received from the image forming apparatus.

[11] An image processing system comprising: an image forming apparatus which outputs target image data; and one image processing sever which performs a series of image processing services in a predetermined order on the target image data originated from the image forming apparatus, while being connected to the image forming apparatus via a network, the image forming apparatus comprising:
an area controller which permits areas in the target image data, to be subjected to image processing by the image processing server and/or prohibits areas in the target image data, from being subjected to image processing by the image processing server; and
a transmitter which transmits information of the areas permitted by the area controller and/or the areas prohibited by the area controller, to the image processing server, the image processing server comprising:
an image processor which performs an image processing service on the permitted areas and/or the target image data excluding the prohibited areas, based on the information of the permitted areas and/or the prohibited areas, which is received from the image forming apparatus.

[12] An image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, the image forming apparatus comprising:

an area information obtainer which obtains area information indicating target areas to be subjected to image processing by the image processing servers, from the image processing servers by outputting thereto the target image data;
a judgment portion which judges whether or not the target areas to be subjected to image processing by the image processing servers are overlapping each other, based on the area information obtained by the area information obtainer;
a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and
a transmitter which transmits information of the target areas which are determined by the judgment portion to be not overlapping each other.

[13] An image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, the image forming apparatus comprising:

an area controller which permits areas in the target image data, to be subjected to image processing by the image processing servers and/or prohibits areas in the target image data, from being subjected to image processing by the image processing servers; and
a transmitter which transmits information of the areas permitted by the area controller and/or the areas prohibited by the area controller, to the image processing servers.

[14] An image processing method for an image processing system comprising: an image forming apparatus which outputs target image data; and a plurality of image processing servers which cooperatively perform a series of image processing services in a predetermined order on target image data originated from the image forming apparatus, while being connected to the image forming apparatus via a network,
the image processing method comprising:
the following steps of the image forming apparatus:
obtaining area information indicating target areas to be subjected to image processing by the image processing servers, from the image processing servers by outputting thereto the target image data;
judging whether or not the target areas to be subjected to image processing by the image processing servers are overlapping each other, based on the area information obtained;
examining the priority levels set in advance for the image processing servers if it is judged that the target areas are overlapping each other, then repeating to instruct an image processing server with a lower priority level than another image processing server to adjust the position of its target area until it is judged that the target areas are not overlapping each other; and
transmitting information of the target areas which are determined to be not overlapping each other; and
the following steps of each of the image processing servers:
adjusting the positions of the target areas according to instructions from the image forming apparatus; and
performing an image processing service on the target image data based on the information of the target areas determined to be not overlapping each other, which is received from the image forming apparatus.

[15] An image processing method for an image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image processing method comprising:
the following steps of the image forming apparatus:
permitting areas in the target image data, to be subjected to image processing by the image processing servers and/or prohibiting areas in the target image data, from being subjected to image processing by the image processing servers; and
transmitting information of the permitted areas and/or the prohibited areas to the image processing servers; and
the following step of each of the image processing servers:
performing an image processing service on the permitted areas and/or the target image data excluding the prohibited areas, based on the information of the permitted areas and/or the prohibited areas, which is received from the image forming apparatus.

[16] A non-transitory computer-readable recording medium with an image processing program being stored thereon to make a computer of an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, execute:
obtaining area information indicating target areas to be subjected to image processing by the image processing servers, from the image processing servers by outputting thereto the target image data;

judging whether or not the target areas to be subjected to image processing by the image processing servers are overlapping each other, based on the area information obtained;

examining the priority levels set in advance for the image processing servers if it is judged that the target areas are overlapping each other, then repeating to instruct an image processing server with a lower priority level than another image processing server to adjust the position of its target area until it is judged that the target areas are not overlapping each other; and transmitting information of the target areas which are determined to be not overlapping each other.

[17] A non-transitory computer-readable recording medium with an image processing program being stored thereon to make a computer of an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, execute:

permitting areas in the target image data, to be subjected to image processing by the image processing servers and/or prohibiting areas in the target image data, from being subjected to image processing by the image processing servers; and transmitting information of the permitted areas and/or the prohibited areas to the image processing servers.

According to the mode of implementing the present invention as recited in the aforementioned item [1], the image forming apparatus transmits target image data to the image processing servers to obtain area information indicating their target areas therefrom. Based on the area information received therefrom, the image forming apparatus judges whether or not the target areas of the image processing servers are overlapping each other. If it is judged that the target areas are overlapping each other, the image forming apparatus examines the priority levels set in advance for the image processing servers, and repeats to instruct an image processing server with a lower priority level than another image processing server to adjust the position of its target area until it is judged that the target areas are not overlapping each other. If it is judged that the target areas are not overlapping each other, the image forming apparatus transmits the target areas confirmed to be not overlapping each other, to the image processing servers. The image processing servers perform image processing on their own target areas in the target image data, which are confirmed by the image forming apparatus to be not overlapping each other.

Since the image forming apparatus can confirm the image processing servers' target areas in the target image data, to be not overlapping each other in this way described above, the target image data obtained by an image processing service will not be adversely affected by the next image processing service, and this therefore can resolve the problem that the target image data results in being totally against the user's original intention.

According to the mode of implementing the present invention as recited in the aforementioned item [2], even when one of the image processing server performs a data merging operation as an image processing service on its own target area in the target image data, the target area obtained by the data merging operation will not be adversely affected by the next image processing service.

According to the mode of implementing the present invention as recited in the aforementioned item [3], a character string which is a data object merged to the target image data will not be adversely affected by the next image processing service to be an unintended form.

According to the mode of implementing the present invention as recited in the aforementioned item [4], an image including a character string which is a data object merged to the target image data will not be adversely affected by the next image processing service to be an unintended form.

According to the mode of implementing the present invention as recited in the aforementioned item [5], a barcode or a two-dimensional code representing a code which is a data object merged to the target image data will not be adversely affected by the next image processing service to be unreadable.

According to the mode of implementing the present invention as recited in the aforementioned item [6], the image processing servers transfer the target image data among themselves and perform their own image processing services thereon, according to the order indicated by the order information generated by the image forming apparatus.

According to the mode of implementing the present invention as recited in the aforementioned item [7], every single of the image processing servers transmits the target image data to the image forming apparatus after performing its own image processing service, and the image forming apparatus transfers it to a particular one of the image processing servers, which is in charge of the next image processing service.

According to the mode of implementing the present invention as recited in the aforementioned item [8], every single of the image processing servers transmits the target image data to the mediation server after performing its own image processing service, and the mediation server transfers it to a particular one of the image processing servers, which is in charge of the next image processing service.

According to the mode of implementing the present invention as recited in the aforementioned item [9], the image forming apparatus permits areas in the target image data, to be subjected to image processing by the image processing servers and/or prohibits areas in the target image data, from being subjected to image processing by the image processing servers, then transmits information of the permitted and/or prohibited areas to the image processing servers. And the image processing servers perform image processing on the permitted areas and/or the target image data excluding the prohibited areas, based on the information received from the image forming apparatus. That is, by permitting and/or prohibiting areas in the target image data, the image forming apparatus can specify target areas to be subjected to image processing, which are not overlapping each other. And target image data obtained by an image processing service will not be adversely affected by the next image processing service, and this therefore can resolve the problem that the target image data results in being totally against the user's original intention.

According to the mode of implementing the present invention as recited in the aforementioned item [10], if one image processing server is in charge of a plurality of and different image processing services, the image forming apparatus can confirm the image processing server's target areas in the target image data, to be not overlapping each other. And target image data obtained by an image processing service will not be adversely affected by the next image processing service, and this therefore can resolve the problem that the target image data results in being totally against the user's original intention.

According to the mode of implementing the present invention as recited in the aforementioned item [11], if one image processing server is in charge of a plurality of and different image processing services, the image forming apparatus can permit areas in the target image data, to be subjected to image processing by the image processing server and/or prohibit areas in the target image data, from being subjected to image processing by the image processing server, then transmit information of the permitted and/or prohibited areas to the image processing server. And the image processing server performs image processing on the permitted areas and/or the target image data excluding the prohibited areas based on the information received from the image forming apparatus. And target image data obtained by an image processing service will not be adversely affected by the next image processing service, and this therefore can resolve the problem that the target image data results in being totally against the user's original intention.

According to the mode of implementing the present invention as recited in the aforementioned item [12], the image forming apparatus can confirm the image processing servers' target areas in target image data, to be not overlapping each other. And target image data obtained by an image processing service will not be adversely affected by the next image processing service, and this therefore can resolve the problem that the target image data results in being totally against the user's original intention.

According to the mode of implementing the present invention as recited in the aforementioned item [13], the image forming apparatus can permit areas in the target image data, to be subjected to image processing by the image processing servers and/or prohibit areas in the target image data, from being subjected to image processing by the image processing servers, then transmit information of the permitted and/or prohibited areas to the image processing servers. That is, by permitting and/or prohibiting areas in the target image data, the image forming apparatus can specify target areas to be subjected to image processing, which are not overlapping each other. And target image data obtained by an image processing service will not be adversely affected by the next image processing service, and this therefore can resolve the problem that the target image data results in being totally against the user's original intention.

According to the mode of implementing the present invention as recited in the aforementioned item [14], the image forming apparatus can confirm the image processing servers' target areas in target image data, to be not overlapping each other. And target image data obtained by an image processing service will not be adversely affected by the next image processing service, and this therefore can resolve the problem that the target image data results in being totally against the user's original intention.

According to the mode of implementing the present invention as recited in the aforementioned item [15], the image forming apparatus can permit areas in the target image data, to be subjected to image processing by the image processing servers and/or prohibit areas in the target image data, from being subjected to image processing by the image processing servers. And target image data obtained by an image processing service will not be adversely affected by the next image processing service, and this therefore can resolve the problem that the target image data results in being totally against the user's original intention.

According to the mode of implementing the present invention as recited in the aforementioned item [16], a computer of the image forming apparatus is allowed to confirm the target areas in the target image data, to be not overlapping each other.

According to the mode of implementing the present invention as recited in the aforementioned item [17], a computer of the image forming apparatus is allowed to permit areas in the target image data, to be subjected to image processing by the image processing servers and/or prohibit areas in the target image data, from being subjected to image processing by the image processing servers, then transmit information of the permitted and/or prohibited areas to the image processing servers.

While the present invention may be embodied in many different forms, a number of illustrative embodiments are described herein with the understanding that the present disclosure is to be considered as providing examples of the principles of the invention and such examples are not intended to limit the invention to preferred embodiments described herein and/or illustrated herein.

While illustrative embodiments of the invention have been described herein, the present invention is not limited to the various preferred embodiments described herein, but includes any and all embodiments having equivalent elements, modifications, omissions, combinations (e.g. of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to". In this disclosure and during the prosecution of this application, means-plus-function or step-plus-function limitations will only be employed where for a specific claim limitation all of the following conditions are present In that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure and during the prosecution of this case, the following abbreviated terminology may be employed: "e.g." which means "for example", and "NB" which means "note well".

What is claimed is:

1. An image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image forming apparatus comprising:
- an area information obtainer which obtains area information indicating target areas to be subjected to image processing by the image processing servers, from the image processing servers by outputting thereto the target image data;
- a judgment portion which judges whether or not the target areas to be subjected to image processing by the image processing servers are overlapping each other, based on the area information obtained by the area information obtainer;
- a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and
- a transmitter which transmits information of the target areas which are determined by the judgment portion to be not overlapping each other, the image processing servers each comprising:
- a target area adjuster which adjusts the positions of the target areas according to instructions from the image forming apparatus; and
- an image processor which performs an image processing service on the target image data based on the information of the target areas determined to be not overlapping each other, which is received from the image forming apparatus.

2. The image processing system as recited in claim 1, wherein at least one of the image processing servers performs an operation to merge a target data object to the target image data as its own image processing service.

3. The image processing system as recited in claim 2, wherein the target data object to be merged to the target image data is a character string.

4. The image processing system as recited in claim 2, wherein the target data object to be merged to the target image data is an image including a character string.

5. The image processing system as recited in claim 2, wherein the target data object to be merged to the target image data is a barcode or two-dimensional code representing a certain code.

6. The image processing system as recited in claim 1, wherein the image forming apparatus further comprises an order information generator generates order information defining the order of the image processing services to be performed by the image processing servers, and the image processing servers transfer the target image data among themselves according to the order defined by the order information generated by the order information generator to cooperatively perform the image processing services in that order.

7. The image processing system as recited in claim 1, wherein every single of the image processing servers returns the target image data to the image forming apparatus after performing its own image processing service, and the image forming apparatus transfers the target image data received therefrom, to a particular one of the image processing servers according to the order.

8. The image processing system as recited in claim 1, wherein:
- a mediation server is connected between the image forming apparatus and a group of the image processing servers via the network; and
- every single of the image processing servers returns the target image data to the mediation server after performing its own image processing service, and the mediation server transfers the target image data received therefrom, to a particular one of the image processing servers according to the order.

9. An image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image forming apparatus comprising:
- an area controller which permits areas in the target image data, to be subjected to image processing by the image processing servers and/or prohibits areas in the target image data, from being subjected to image processing by the image processing servers; and
- a transmitter which transmits information of the areas permitted by the area controller and/or the areas prohibited by the area controller, to the image processing servers, the image processing servers each comprising:
- an image processor which performs an image processing service on the permitted areas and/or the target image data excluding the prohibited areas, based on the information of the permitted areas and/or the prohibited areas, which is received from the image forming apparatus.

10. An image processing system comprising: an image forming apparatus which outputs target image data; and one image processing sever which performs a series of image processing services in a predetermined order on the target image data originated from the image forming apparatus, while being connected to the image forming apparatus via a network, the image forming apparatus comprising:
- an area information obtainer which obtains area information indicating target areas to be subjected to image processing by the image processing server, from the image processing server by outputting thereto the target image data;
- a judgment portion which judges whether or not the target areas to be subjected to image processing by the image processing server are overlapping each other, based on the area information obtained by the area information obtainer;
- a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and
- a transmitter which transmits information of the target areas which are determined by the judgment portion to be not overlapping each other, to the image processing server, the image processing server comprising:
- a target area adjuster which adjusts the positions of the target areas according to instructions from the image forming apparatus;

a transmitter which transmits information of the target areas which are before and after adjusting their positions by the target area adjuster, to the image forming apparatus; and an image processor which performs an image processing service on the target image data based on the information of the target areas determined to be not overlapping each other, which is received from the image forming apparatus.

11. An image processing system comprising: an image forming apparatus which outputs target image data; and one image processing sever which performs a series of image processing services in a predetermined order on the target image data originated from the image forming apparatus, while being connected to the image forming apparatus via a network, the image forming apparatus comprising:

an area controller which permits areas in the target image data, to be subjected to image processing by the image processing server and/or prohibits areas in the target image data, from being subjected to image processing by the image processing server; and a transmitter which transmits information of the areas permitted by the area controller and/or the areas prohibited by the area controller, to the image processing server, the image processing server comprising:

an image processor which performs an image processing service on the permitted areas and/or the target image data excluding the prohibited areas, based on the information of the permitted areas and/or the prohibited areas, which is received from the image forming apparatus.

12. An image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, the image forming apparatus comprising:

an area information obtainer which obtains area information indicating target areas to be subjected to image processing by the image processing servers, from the image processing servers by outputting thereto the target image data;

a judgment portion which judges whether or not the target areas to be subjected to image processing by the image processing servers are overlapping each other, based on the area information obtained by the area information obtainer;

a target area adjustment controller which examines the priority levels set in advance for the image processing servers if it is judged by the judgment portion that the target areas are overlapping each other, then repeats to instruct an image processing server with a lower priority level than another image processing server to adjust the position of its target area until it is judged by the judgment portion that the target areas are not overlapping each other; and a transmitter which transmits information of the target areas which are determined by the judgment portion to be not overlapping each other.

13. An image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, the image forming apparatus comprising:

an area controller which permits areas in the target image data, to be subjected to image processing by the image processing servers and/or prohibits areas in the target image data, from being subjected to image processing by the image processing servers; and a transmitter which transmits information of the areas permitted by the area controller and/or the areas prohibited by the area controller, to the image processing servers.

14. An image processing method for an image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image processing method comprising:

the following steps of the image forming apparatus:

obtaining area information indicating target areas to be subjected to image processing by the image processing servers, from the image processing servers by outputting thereto the target image data;

judging whether or not the target areas to be subjected to image processing by the image processing servers are overlapping each other, based on the area information obtained;

examining the priority levels set in advance for the image processing servers if it is judged that the target areas are overlapping each other, then repeating to instruct an image processing server with a lower priority level than another image processing server to adjust the position of its target area until it is judged that the target areas are not overlapping each other; and transmitting information of the target areas which are determined to be not overlapping each other; and the following steps of each of the image processing servers:

adjusting the positions of the target areas according to instructions from the image forming apparatus; and performing an image processing service on the target image data based on the information of the target areas determined to be not overlapping each other, which is received from the image forming apparatus.

15. An image processing method for an image processing system comprising: an image forming apparatus which outputs target image data; and a plurality of image processing servers which cooperatively perform a series of image processing services in a predetermined order on target image data originated from the image forming apparatus, while being connected to the image forming apparatus via a network, the image processing method comprising:

the following steps of the image forming apparatus:

permitting areas in the target image data, to be subjected to image processing by the image processing servers and/or prohibiting areas in the target image data, from being subjected to image processing by the image processing servers; and transmitting information of the permitted areas and/or the prohibited areas to the image processing servers; and the following step of each of the image processing servers:

performing an image processing service on the permitted areas and/or the target image data excluding the prohibited areas, based on the information of the permitted areas and/or the prohibited areas, which is received from the image forming apparatus.

16. A non-transitory computer-readable recording medium with an image processing program being stored thereon to make a computer of an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, execute:

obtaining area information indicating target areas to be subjected to image processing by the image processing servers, from the image processing servers by outputting thereto the target image data;

judging whether or not the target areas to be subjected to image processing by the image processing servers are overlapping each other, based on the area information obtained;

examining the priority levels set in advance for the image processing servers if it is judged that the target areas are overlapping each other, then repeating to instruct an image processing server with a lower priority level than another image processing server to adjust the position of its target area until it is judged that the target areas are not overlapping each other; and transmitting information of the target areas which are determined to be not overlapping each other.

17. A non-transitory computer-readable recording medium with an image processing program being stored thereon to make a computer of an image forming apparatus to be employed in an image processing system comprising: an image forming apparatus which outputs target image data; and a plurality of image processing servers which cooperatively perform a series of image processing services in a predetermined order on the target image data originated from the image forming apparatus, while being connected to the image forming apparatus, execute:

permitting areas in the target image data, to be subjected to image processing by the image processing servers and/or prohibiting areas in the target image data, from being subjected to image processing by the image processing servers; and transmitting information of the permitted areas and/or the prohibited areas to the image processing servers.

* * * * *